US010764879B2

(12) United States Patent
Bendlin et al.

(10) Patent No.: US 10,764,879 B2
(45) Date of Patent: Sep. 1, 2020

(54) APPARATUS AND METHOD FOR IOT CONTROL CHANNEL

(71) Applicant: Intel IP Corporation, Santa Clara, CA (US)

(72) Inventors: Ralf Matthias Bendlin, Portland, OR (US); Debdeep Chatterjee, Mountain View, CA (US); Seunghee Han, San Jose, CA (US)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 16/068,882

(22) PCT Filed: Sep. 26, 2016

(86) PCT No.: PCT/US2016/053759
§ 371 (c)(1),
(2) Date: Jul. 9, 2018

(87) PCT Pub. No.: WO2017/123286
PCT Pub. Date: Jul. 20, 2017

(65) Prior Publication Data
US 2019/0029005 A1 Jan. 24, 2019

Related U.S. Application Data

(60) Provisional application No. 62/277,401, filed on Jan. 11, 2016.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0007* (2013.01)

(58) Field of Classification Search
CPC .................. H04W 72/0042; H04L 5/0007
See application file for complete search history.

(56) References Cited

U.S. PATENT DOCUMENTS

| 2015/0029880 A1 | 1/2015 | Burns et al. |
| 2015/0110033 A1 | 4/2015 | Yi et al. |
| 2017/0202008 A1* | 7/2017 | Nader ............ H04L 1/1887 |

FOREIGN PATENT DOCUMENTS

CN 108432198 8/2018

OTHER PUBLICATIONS

"Discussions on downlink control channel design for NB-IoT", R1-156883, 3GPP TSG RAN WG1 #83, (Nov. 7, 2015), 1-3.
(Continued)

*Primary Examiner* — Angel T Brockman
(74) *Attorney, Agent, or Firm* — Kowert, Hood, Munyon, Rankin & Goetzel, P.C.

(57) ABSTRACT

Embodiments described herein include user equipment (UE), evolved node B (eNB), methods, and systems for narrowband Internet-of-Things (IoT) communications. Some embodiments particularly relate to control channel communications between UE and eNB in narrowband IoT communications. In one embodiment, a UE blind decodes a first control resource block comprising all subcarriers of the transmission bandwidth and all orthogonal frequency division multiplexed symbols of a first subframe to determine the first control transmission. In various further embodiments, various resource groupings of resource elements are used as part of the control communications.

26 Claims, 8 Drawing Sheets

(56) References Cited

OTHER PUBLICATIONS

"DL design for NB-IOT", R1-157070, 3GPP TSG RAN WG1 #83, (Nov. 7, 2015), 4-5.
"General considerations on NB-IOT DL physical layer design", R1-156972, 3GPP TSG RAN WG1 #83, (Nov. 7, 2015), 1-5.
"International Application Serial No. PCT/US2016/053759, International Search Report dated Jan. 5, 2017", 3 pgs.
"International Application U.S. Appl. No. PCT/US2016/053759, Written Opinion dated Jan. 5. 2017", 9 pgs.
"International Application Serial No. PCT US2016 053759, International Preliminary Report on Patentability dated Jul. 26, 2018", 11 pgs.

* cited by examiner

500

505 — RECEIVING, AT A UE, A NARROWBAND CONTROL CHANNEL TRANSMISSION FROM AN ENB, SAID UE DETERMINING RESOURCES AVAILABLE FOR THE TRANSMISSION OF SAID NARROWBAND CONTROL CHANNEL

510 — DETERMINING FROM THE CONTROL CHANNEL, THE STARTING SYMBOL AND/OR SUBFRAME OF THE ASSOCIATED DATA TRANSMISSION; AND/OR ADAPTING RESOURCE ELEMENT GROUPINGS AND/OR AGGREGATION RESOURCE ELEMENT GROUPS DEPENDING ON A NUMBER OF AVAILABLE RESOURCES FOR TRANSMISSION OF SAID NARROWBAND CONTROL CHANNEL

APPARATUS AND METHOD FOR IOT CONTROL CHANNEL

PRIORITY CLAIM

This application is a U.S. National Stage Filing under 35 U.S.C. 371 from International Application No. PCT/US2016/053759, filed Sep. 26, 2016 and published in English as WO 2017/123286 on Jul. 20, 2017, which claims the benefit of priority to U.S. Provisional Patent Application Ser. No. 62/277,401, filed Jan. 11, 2016, and entitled "CONTROL CHANNEL TRANSMISSION FOR NARROWBAND INTERNET-OF-THINGS SYSTEMS," each of which is incorporated herein by reference in its entirety.

TECHNICAL FIELD

Embodiments pertain to radio access networks. Some embodiments relate to providing data in cellular and wireless local area network (WLAN) networks, including Third Generation Partnership Project Long Term Evolution (3GPP LTE) networks and LTE advanced (LTE-A) networks as well as 4th generation (4G) networks and $5^{th}$ generation (5G) networks, all of which are hereinafter referred to as LTE networks. Some embodiments particularly relate to narrowband internet-of-things (IoT) systems.

BACKGROUND

The use of 3GPP LTE systems (including LTE and LTE-Advanced systems) has increased due to an increase in both the types of user equipment (UEs) using network resources and the amount of data and bandwidth being used by various applications, such as video streaming, operating on these UEs. As a result, 3GPP LTE systems continue to develop, with the next-generation wireless communication system, 5G, aiming to answer the ever-increasing demand for bandwidth.

In particular, machine-type communications (MTC) include different resource demands than other types of systems, and therefore network communications structured for IoT systems may drive demand for new network communication structures.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 5 illustrates a method for control channel communications in a NB-IoT system, in accordance with embodiments described herein.

DETAILED DESCRIPTION

Embodiments pertain to radio access networks. Some embodiments relate to providing data in cellular and WLAN networks, including 3GPP LTE networks and LTE-A networks as well as 4G networks and 5G networks, all of which are hereinafter referred to as LTE networks. Some embodiments particularly relate to narrowband NB-IoT systems.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
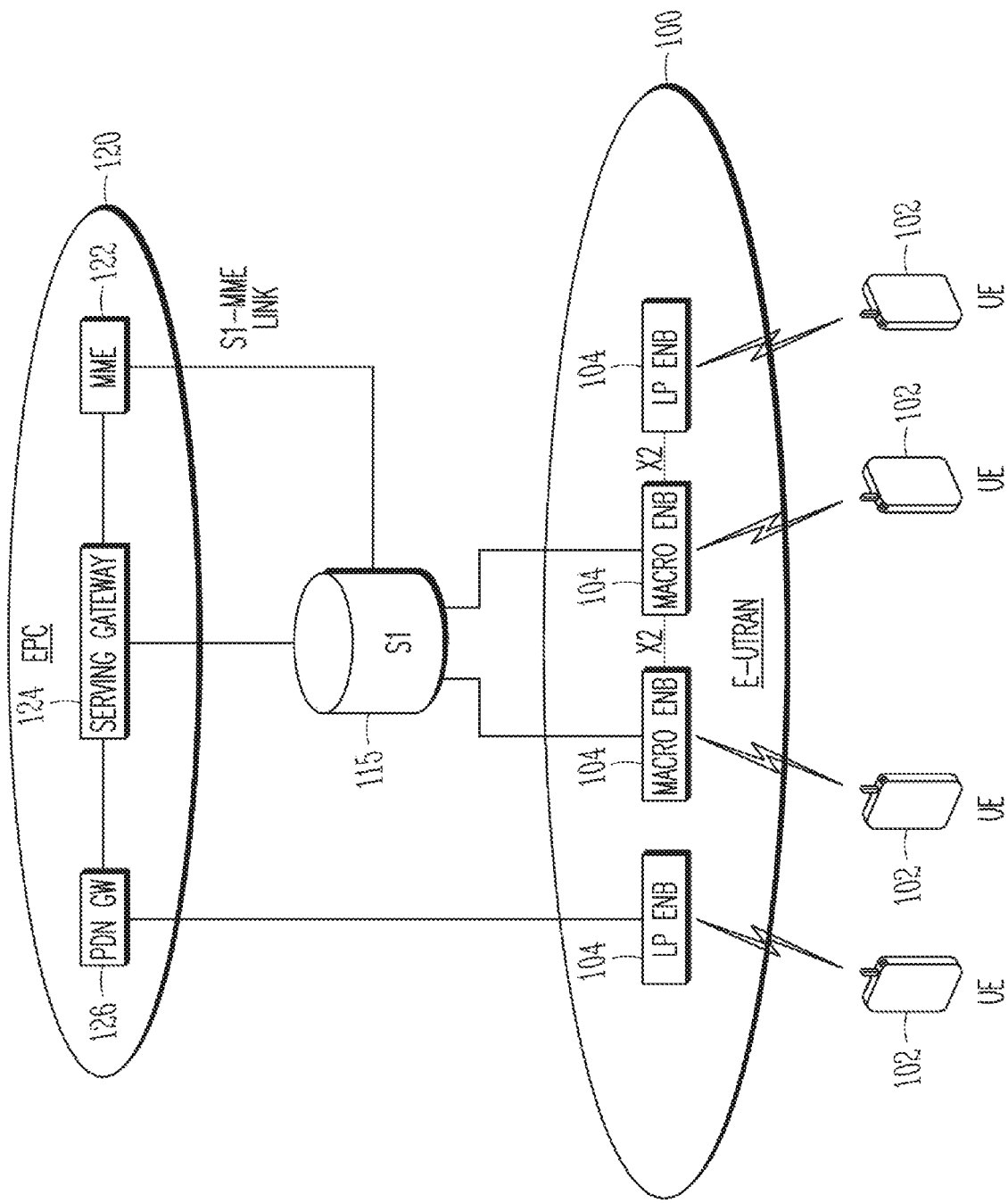
FIG. 1 is a functional diagram of a wireless network, in accordance with some embodiments.

FIG. 1 shows an example of a portion of an end-to-end network architecture of a network (e.g., an LTE network) with various components of the network, in accordance with some embodiments. In particular, some communications between evolved universal mobile telecommunications system terrestrial radio access nodes (evolved node Bs or eNBs) 104 and UEs 102 may involve MTC that have different resource demands than user application driven communications. In various embodiments, these MIC operations may be used in an LTE network such as the networks of FIGS. 1-3, or in any other such communication network. As used herein, an LTE network refers to both LTE and LTE-A networks as well as other versions of LTE networks in development, such as 4G and 5G LTE networks. The network may comprise a radio access network (RAN) (e.g., as depicted, the Evolved Universal Mobile Telecommunications System (UMTS) Terrestrial Radio Access Netowork (E-UTRAN) or evolved universal terrestrial radio access network) 100 and a core network 120 (e.g., shown as an evolved packet core (EPC)) coupled together through an S1 interface 115. For convenience and brevity, only a portion of the core network 120, as well as the RAN 100, is shown in the example.

The core network 120 may include a mobility management entity (MME) 122, a serving gateway (serving GW) 124, and a packet data network gateway (PDN GW) 126. The RAN 101 may include evolved node Bs (eNBs) 104 (which may operate as base stations) for communicating with UE 102. The eNBs 104 may include macro eNBs 104 and low power (LP) eNBs 104. The eNBs 104 and UEs 102 may employ the techniques described herein.

The MME 122 may be similar in function to the control plane of legacy Serving General Packet Radio Service (GPRS) Support Nodes (SGSN) The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented m one physical node or separate physical nodes.

The PDN GW 126 may terminate a SGi interface toward the packet data network (PDN). The PDN GW 126 may route data packets between the core network 120 and the external PDN, and may perform policy enforcement and charging data collection. The PDN GW 126 may also provide an anchor point for mobility devices with non-LTE access. The external PDN can be any kind of Internet Protocol (IP) network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller) functions such as radio bearer management, uplink and downlink dynamic radio resource management and data packet scheduling, and mobility management. In accordance with embodiments, the UEs 102 may be configured to communicate orthogonal frequency division multiplexed (OFDM) communication signals with an eNB 104 over a multicarrier communication channel in accordance with an orthogonal frequency-division multiple access (OFDMA) communication technique. The OFDM signals may comprise a plurality of orthogonal subcarriers.

The S1 interface 115 may be the interface that separates the RAN 101 and the core network 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104. While the X2-U may be the user plane interface between the eNBs 104.

With cellular networks, LP eNBs 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands, with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.) or, more recently, in-aircraft. A picocell eNB may generally connect through the X2 link to another eNB such as a macro eNB through its base station controller (BSC) functionality. Thus, a LP eNB 104b may be implemented with a picocell eNB since it may be coupled to a macro eNB 104a via an X2 interface. Picocell eNBs or other LP eNBs 104b may incorporate some or all functionality of a macro eNB 104a or LP eNB 104a. In some cases, this may be referred to as an access point base station or enterprise femtocell.

Communication over an LTE network may be split up into 10$ms$ radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE 102. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms), the subframe size, and the number of subframes within a frame, as well as the frame structure, may be different from those of a 4G or LTE system. The subframe size, as well as the number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in some embodiments may be 180 kHz wide in frequency and 1 slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (full-duplex) or time (half-duplex) separated. The duration of the resource grid in the time domain corresponds to one subframe or two resource blocks. Each resource grid may comprise 12 (subcarriers)*14 (symbols)=168 resource elements.

Each OFDM symbol may contain a cyclic prefix (CP), which may be used to effectively eliminate inter Symbol Interference (ISI), and a Fast Fourier Transform (ITT) period. The duration of the CP may be determined by the highest anticipated degree of delay spread. Although distortion from the preceding OFDM symbol may exist within the CP, preceding OFDM symbols do not enter the FTT period with a CP of sufficient duration. Once the FFT period signal is received and digitized, the receiver may ignore the signal in the CP.

Figure 2:
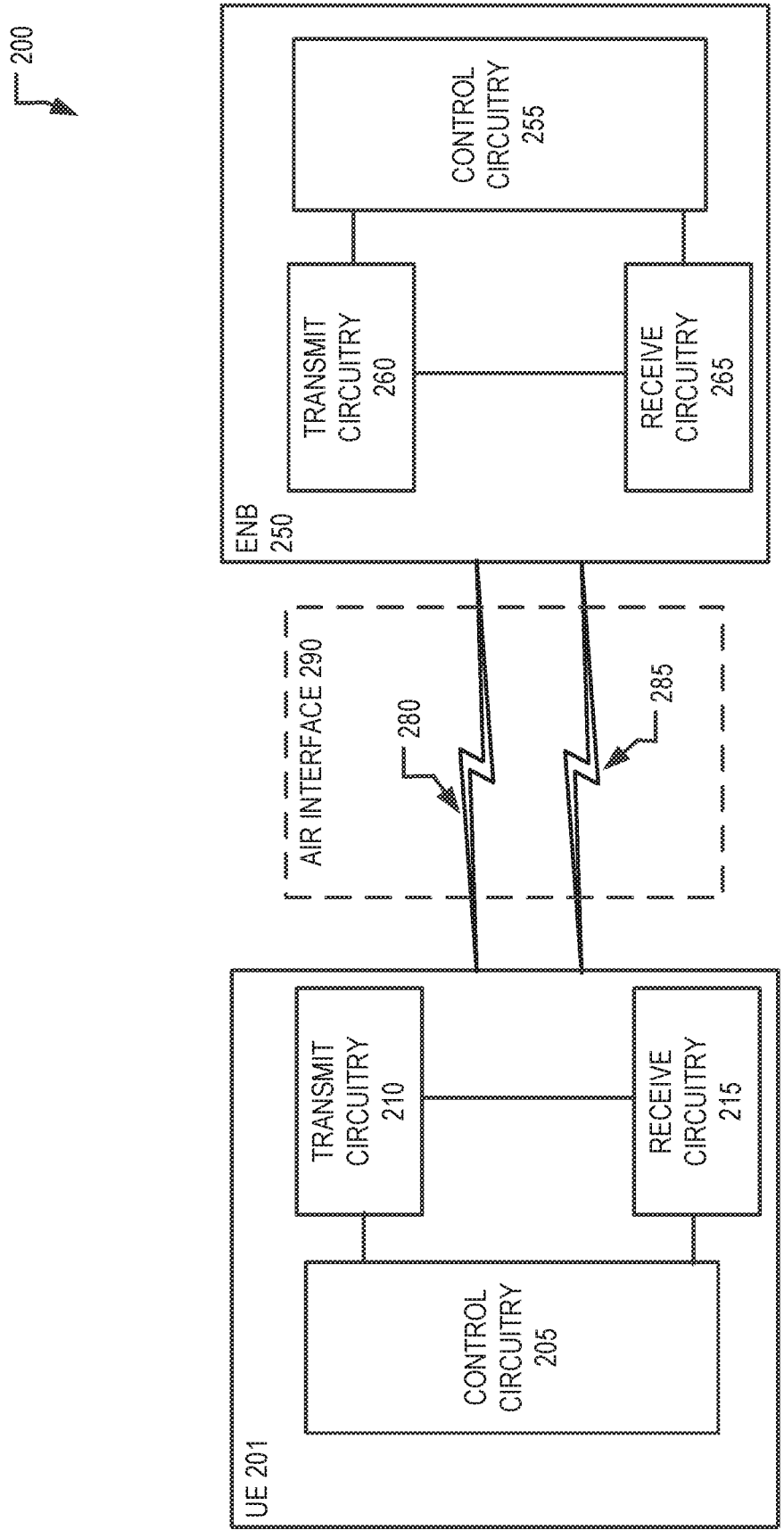
FIG. 2 illustrates components of a communication network, in accordance with some embodiments.

FIG. 2 illustrates a wireless network 200, in accordance with some embodiments. The wireless network 200 includes a UE 201 and an eNB 250 connected via one or more channels 280, 285 across an air interface 290. The UE 201 and eNB 250 communicate using a system that supports controls for managing the access of the UE 201 to a network via the eNB 250.

In the wireless network 200, the UE 201 and any other UE in the system may be, for example, laptop computers, smartphones, tablet computers, primers, machine-type devices such as smart meters or specialized devices for healthcare monitoring, remote security surveillance systems, intelligent transportation systems, or any other wireless devices with or without a user interface. The eNB 250 provides the UE 201 network connectivity to a broader network (not shown). This UE 201 connectivity is provided via the air interface 290 in an eNB service area provided by the eNB 250. In some embodiments, such a broader network may be a wide area network (WAN) operated by a cellular network provider, or may be the Internet. Each eNB service area associated with the eNB 250 is supported by antennas integrated with the eNB 250. The service areas are divided into a number of sectors associated with certain antennas.

The UE 201 includes control circuitry 205 coupled with transmit circuitry 210 and receive circuitry 215. The transmit circuitry 210 and receive circuitry 215 may each be coupled with one or more antennas. The control circuitry 205 may be adapted to perform operations associated with wireless communications using congestion control. The control circuitry 205 may include various combinations of application specific circuitry and baseband circuitry. The transmit circuitry 210 and receive circuitry 215 may be adapted to transmit and receive data, respectively, and may include radio frequency (RF) circuitry or front end module (FEM) circuitry. In various embodiments, aspects of the transmit circuitry 210, receive circuitry 215, and control circuitry 205 may be integrated in various ways to implement the circuitry described herein. The control circuitry 205 may be adapted or configured to perform various operations such as those described elsewhere in this disclosure related to a UE. The transmit circuitry 210 may transmit a plurality of multiplexed uplink physical channels. The plurality of uplink physical channels may be multiplexed according to time division multiplexing (TDM) or frequency division multiplexing (FDM) along with carrier aggregation. The transmit circuitry 210 may be configured to receive block data from the control circuitry 205 for transmission across the air interface 290. Similarly, the receive circuitry 215 may receive a plurality of multiplexed downlink physical channels from the air interface 290 and relay the physical channels to the control circuitry 205. The plurality of downlink physical channels may be multiplexed according to TDM or FDM along with carrier aggregation. The transmit circuitry 210 and the receive circuitry 215 may transmit and receive both control data and content data (e.g., messages, images, video, etc.) structured within data blocks that are carried by the physical channels.

FIG. 2 also illustrates the eNB 250, in accordance with various embodiments. The eNB 250 circuitry may include control circuitry 255 coupled with transmit circuitry 260 and receive circuitry 265. The transmit circuitry 260 and receive circuitry 265 may each be coupled with one or more antennas that may be used to enable communications via the air interface 290.

The control circuitry 255 may be adapted to perform operations for managing channels and congestion control communications used with various UEs, including communication of open mobile alliance management objects (OMA-MOs) describing application categories as detailed further below. The transmit circuitry 260 and receive circuitry 265 may be adapted to transmit and receive data, respectively, to any UE connected to the eNB 250. The transmit circuitry 260 may transmit downlink physical channels comprised of a plurality of downlink subframes. The receive circuitry 265 may receive a plurality of uplink physical channels from various UEs including the UE 201.

In some releases of 3GPP LTE standards, a Physical Downlink Control Channel (PDCCH) was defined, which spans the entire system bandwidth and $\{1,2,3\}$ Orthogonal Frequency-Division Multiplexing (OFDM) symbols for system bandwidths larger than 1.4 MHz and $\{2,3,4\}$ OFDM symbols otherwise. The span of the PDCCH in the time domain in number of OFDM symbols is dynamically signaled on the first OFDM symbol of every subframe by means of a Control Format Indicator (CFI) transmitted on the Physical Control Format Indicator Channel (PCFICH). After successfully decoding the PCFICH on the first OFDM symbol, the UE can determine the PDCCH resources and commence decoding the PDCCH.

The eNB scheduler of the 3GPP LTE Rel. 8-14 wireless communications system can dynamically adapt the code rate of the PDCCH to use the PDCCH resources. To this end, different Aggregation Levels (ALs) are defined, with each of them representing a different code rate for the transmission of Downlink Control Information (DCI). The UE, since it does not a priori know the dynamically adapted code rate of the transmitted DCI, blindly detects the aggregation levels (AL) of a PDCCH. For decoding of the PDCCH while maintaining utmost flexibility at the eNB encoder, search spaces are defined that map the physical resources in the PDCCH region to a logical numbering of Control Channel Elements (CCEs). The aforementioned ALs are defined based on these CCEs. For example, aggregation levels $\{1,2,4,8\}$ correspond to $\{1,2,4,8\}$ CCEs where the exact CCE indices for the $\{1,2,4,8\}$ CCEs depend on the Search Space (SS) definition. This detection of aspects of the PDCCH is referred to herein as blind detection or blind decoding. In various embodiments, blind decoding refers to a device (e.g. a UE) having limited or incomplete information to decode a channel, and attempting multiple combinations of decoding options (e.g. blind decoding trials) to determine the correct combination for decoding.

In 3GPP LTE Release II, a new control channel was introduced called the enhanced PDCCH (EPDCCH). The EPDCCH is transmitted on a subset of the Physical Resource Blocks (PRBs) and spans the entire subframe, in the time domain, in those PRB-pairs configured for EPDCCH transmission by the Radio Resource Control (RRC) protocol. For example, $\{2,4,8\}$ PRB pairs may be reserved for EPDCCH transmissions within which the UE will attempt to blindly decode the EPDCCH. The mapping of the physical resources in the configured PRB pairs for EPDCCH transmission follows the same principle as does the PDCCH, i.e., enhanced CCE (ECCEs) are defined that map the Resource Elements (REs) in the configured EPDCCH resources to logical ECCE indices on which the search space is defined. The eNB scheduler can again dynamically adapt the code rate of the DCI transmission on the EPDCCH by changing the aggregation level of the EPDCCH, where the AL is similarly defined by different numbers of ECCEs to which the EPDCCH is mapped, i.e., the number of modulated symbols can vary depending on the number of allocated ECCEs. The EPDCCH supports ALs $\{1,2,4,8,16,32\}$.

The mapping of the logical search space to the physical resources used for transmission of the DCI differs for both the EPDCCH and PDCCH. For the latter, CCEs are mapped to resource elements (physical resources for transmission of the PDCCH) by definition of Resource Element Groups (REGs), and one control channel element corresponds to nine resource element groups. The number of REGs (and consequently the number of CCEs) in one subframe is a cell-specific function of the dynamically signaled CFI and the broadcasted system information of the cell. For example, after decoding the Physical Broadcast Channel (PBCH), the UE obtains the Physical HARQ Indicator Channel (PHICH) configuration of the cell which is carried in the Master Information Block (MIB) transmitted on the PBCH. Said PHICH configuration, together with the cell-specific antenna port (AP) configuration of the cell and the CFI, determines the total number of REGs NREG in the given subframe, which the UE can deterministically obtain from decoding the PBCH and PCFICH. Based on the knowledge of NREG, the UE receiver can determine the search space and proceed to decode the PDCCH candidates in the subframe.

For the EPDCCH, on the other hand, the number of EREGs per subframe is fixed by specification. There are 16 EREGs, numbered from 0 to 15, per physical resource block pair. As a consequence, the actual number of REs in an EREG used for transmission of EPDCCH may differ, whereas for the PDCCH, one REG always comprises four resource elements (termed a quadruplet of symbols). For example, the actual number of EPDCCH REs within an EREG may depend on the cell's Cell-specific Reference Signal (CRS) configuration, a UE's Channel State Information Reference Signal (CSI-RS) configuration, and so forth.

In 3GPP LTE Rel. 13, yet another two control channels were defined: the M-PDCCH and the NB-PDCCH. The former is defined for a legacy LTE system bandwidth, namely, six PRBs. The latter, however, is restricted to a 180 kHz RF bandwidth corresponding to a single PRB with 15 kHz sub-carrier spacing of the Orthogonal Frequency-Division Multiplexing (OFDM) waveform. The narrowband nature of the NB-PDCCH (for narrowband PDCCH) makes the control channel design particularly challenging. Embodiments herein relate to novel control channel formats and associated NB-REG and NB-CCE definitions for efficient operation of the control channel in a narrowband (NB) OFDM system.

In some embodiments, for efficient operation of a narrowband LTE (NB-LTE) or narrowband Internet-of-Things (NB-IoT) wireless communications system, control channel resources need to be adjustable to the coverage condition of narrowband UE in a dynamic fashion. Several considerations make the control channel design particularly challenging, including the narrowband nature of the NB-IoT system (e.g., a single Physical Resource Block (PRB) may be available per Transmission Time Interval (TTI), which renders the available resources for transmission of Downlink Control Information (DCI) particularly scarce). Moreover, additional robustness is used in the design of IoT systems owing to the challenging coverage conditions in which IoT devices may be deployed (e.g., water meters, gas meters, electricity meters, devices in underground locations, etc.) Further, simplicity of the design is crucial to facilitate low cost and low complexity implementations of the IoT receiver circuitry, a fundamental requirement stemming from the large number of IoT devices to be deployed in smart cities.

Trading off the aforementioned performance indicators such as efficiency, simplicity, and robustness leads to new design paradigms that may vastly differ from traditional control channel designs for mobile broadband UE. In particular, the mapping of logical Control Channel Elements (CCEs) on which the search spaces are defined that allow the IoT UE to decode the NB-PDCCH to physical resources for transmission of the NB-PDCCH waveform take these constraints into account. The disclosure herein relates to narrowband search space design, narrowband resource mapping definitions and procedures, multiplexing of narrowband control channel transmissions, scheduling of NB-IoT UEs in different coverage conditions, and so forth.

The Third Generation Partnership Project (3GPP) introduced a narrowband Internet-of-Things (NB-IoT) design into its Release 13 specifications of the Long-Term Evolution (LTE) wireless mobile communications standard. The 3GPP LTE NB-IoT specifications define a Radio Access Technology (RAT) for a cellular Internet-of-Things (CIoT) based on a non-backward-compatible variant of the evolved Universal Mobile Telecommunications System (UMTS) Terrestrial Radio Access (E-UTRA) standard specifically tailored towards improved indoor coverage, support for a massive number of low throughput devices, low delay sensitivity, ultra-low device cost, low device power consumption, and (optimized) network architecture.

The 3GPP LTE NB-IoT standard furthermore supports three different modes of operation: stand-alone, guard-band, and in-band. For the former two, all resources within the NB-IoT carrier are available for transmission of NB-IoT signals and channels. A NB-IoT carrier generally comprises one legacy LTE Physical Resource Block (PRB) corresponding to a system bandwidth of 180 kHz for a subcarrier spacing of 15 kHz. LTE NB-IoT (or NB-LTE) is based on Orthogonal Frequency-Division Multiple Access (OFDMA) in the downlink (DL) and Single-Carrier Frequency-Division Multiple Access (SC-FDMA) in the uplink (UL). Different numerologies may be supported and the embodiments herein shall apply to any such numerology.

In accordance with embodiments described herein, an NB-IoT physical layer design uses a subset of the channels defined for legacy LTE systems. Thus, some channels may not be defined for NB-IoT systems. An NB-IoT UE may perform a cell search to identify a suitable cell to connect to the Internet. The NB-IoT UE attempts to detect a narrowband Primary Synchronization Signal (NB-PSS). The NB-IoT UE may also use the NB-PSS to synchronize its clock with the NB-IoT network and to detect the symbol boundaries of the OFDM waveforms. The NB-IoT UE then attempts to obtain the downlink subframe and frame timing as well as the Physical Cell ID (PCI) of the NB-IoT carrier using a narrowband Secondary Synchronization Signal (NB-SSS). From the cell ID and the radio frame synchronization, the UE can proceed to decode the narrowband Physical Broadcast Channel (NB-PBCH), which may contain scheduling information for additional system information transmissions. Acquiring the NB-IoT system information will enable the NB-IoT UE to initiate a Random Access (RA) procedure to attach to the NB-IoT network. The network responds to the random access procedure with a Random Access Response (RAR). The random access procedure allows the network to configure the NB-IoT UE for communication with the network and may comprise a contention resolution procedure. After connection establishment, the network can configure the NB-IoT UE with cell-specific and UE-specific Radio Resource Control (RRC) parameters to control the NB-IoT UE's transmission and reception behavior.

Most communication between the NB-IoT UE and the network are scheduled by the NB-PDCCH. An exception is the use of the Random Access Channel (RACH)). The NB-PDCCH conveys Downlink Control Information (DCI) from the eNB to the NB-IoT UE that schedules NB-PDSCH and NB-PUSCH transmissions in the downlink and uplink, respectively. Other channels may not be needed in an NB-LTE system but are not precluded.

Demodulation of the NB-PBCH, NB-PDCCH, and NB-PDSCH may be based on Cell-specific Reference Signals (CRS), Demodulation Reference Signals (DMRS), or Narrowband Reference Signals (NB-RS), although these are not meant to be construed in a limiting sense and other naming conventions are not precluded. Moreover, different channels may be modulated using different reference signals. Lastly, a single channel may be demodulated using several reference signals. For example, the NB-PBCH may be demodulated using NB-RS, whereas the NB-PDCCH may be demodulated using CRS. In a different example, the NB-PDCCH may be demodulated using CRS when the NB-IoT UE is in good coverage conditions whereas other NB-IoT UEs may use both CRS and NB-RS to demodulate the NB-PDCCH. Even more examples will be apparent to a person of skill in the art.

For various embodiments, the NB-PDCCH, irrespective of its detailed physical layer (PHY) design, allows an NB-IoT UE to decode the NB-PDCCH without prior knowledge of the physical resources used for transmission of the NB-PDCCH. Unlike the narrowband Physical Downlink Shared Channel (NB-PDCCH) and the narrowband Physical Uplink Shared Channel (NB-PUSCH), whose transmissions are scheduled by DCI comprising the resource allocation and Adaptive Modulation and Coding (AMC) scheme of the transmission. NB-IoT UEs decode the NB-PDCCH without such a priori knowledge. Assuming a fixed modulation scheme for the NB-PDCCH (e.g., Quadrature Phase Shift Keying (QPSK)) and deterministic payload sizes of the DCI, the eNB scheduler can adapt the code rate of a NB-PDCCH transmission by dynamically changing the number of Resource Elements (REs) in the time-frequency grid allocated to a given NB-PDCCH. The NB-IoT UE, in attempting to decode the NB-PDCCH, will blindly decode a defined set of physical resources called a Search Space (SS) for possible NB-PDCCH transmissions whereby a NB-PDCCH is successfully decoded when the Cyclic Redundancy Check (CRC) passes for a NB-PDCCH candidate. Search spaces are logical concepts that are mapped to physical resources by means of Control Channel Elements (CCEs). In embodiments described herein, NB-CCEs shall denote CCEs used to define the mapping to physical resource elements for the NB-PDCCH, however, such a naming convention is not meant to be construed in a limiting sense and other terminologies are not precluded. In particular, a NB-IoT UE will attempt to decode a NB-PDCCH for different code rate hypotheses called Aggregation Levels (ALs), whereby each AL maps to different number of NB-CCEs assumed for transmission of the NB-PDCCH. In other words, NB-PDCCH candidates are defined as a function of both the AL and the CCE indices of a given NB-PDCCH candidate In some embodiments described herein, the number of candidates for a given AL is a priori known to the UE as is the search space definition. Furthermore, the search space definition may comprise a hashing function to randomize CCE indices across subframes to prevent blocking among different NB-IoT UEs. Lastly, logical CCEs are mapped to physical resources used for transmission of the NB-PDCCH by means of Resource Element Groups (REGs). In embodiments described herein, NB-REGs shall denote REGs used to define the mapping of NB-CCEs to physical resource elements; however, such a naming convention is not meant to be construed in a limiting sense and other terminologies are not precluded.

In one embodiment, one NB-CCE corresponds to one PRB-pair. Multiple NB-PDCCHs are multiplexed in a time-division multiplexing (TDM) manner. For example, one NB-PDCCH may be transmitted to one NB-IoT UE in subframe n whereas another NB-PDCCH may be transmitted to another NB-IoT UE in subframe n+1. In a different example, a first NB-IoT UE is in good coverage and is allocated AL=2, whereas a second NB-IoT UE is in extreme coverage and is allocated AL=8. Good [extreme] coverage in this example means that the Mutual Coupling Loss (MCL) between the eNB transmitter and the NB-IoT UE receiver is small (large). The NB-PDCCH for a first NB-IoT UE may then be transmitted in subframes n and n+1, whereas the NB-PDCCH for a second NB-IoT UE is transmitted in subframes n+2, n+3, n+4, . . . n+9. This search space definition may be denoted "localized" as the NB-CCEs comprising one NB-PDCCH are in consecutive subframes.

In some embodiments, as described with respect to some embodiments, ALs may be defined only within a subframe and the accumulation of NB-CCEs across multiple subframes may also be referred to using Repetition Levels (RLs). Hence, for the above embodiment wherein one NB-CCE corresponds to one PRB-pair, this could imply AL=1 is always used and different search space candidates are defined by different RLs (e.g. UEs monitor for different sets of RLs.) Thus, for the above example, AL=1 for both UEs, and RL=2 and RL=8 for the first and second UEs, respectively.

In another embodiment, a first NB-IoT UE is again in good coverage and is allocated AL=2, whereas a second NB-IoT UE is again in good extreme coverage and is allocated AL=8. However, in this example, subframes n and ¬n+k are allocated to a first NB-IoT UE whereas subframes {n+1, ¬n+k+1, ¬n+2×k+1, ¬n+3×k+1, . . . ¬n+7×k+1} are allocated to a second NB-IoT UE. Note that such a division of subframes is merely chosen for ease of exposition and is not meant to be construed in a limiting sense. Other more complicated multiplexing schemes can be envisioned and the differentiating characteristic of this embodiment is that a single NB-PDCCH is not mapped to NB-CCEs in consecutive subframes. Such a search space definition may be denoted "distributed." One motivation for such a distributed search space definition is to prevent blocking among multiple NB-IoT UEs. In some embodiments, for the localized search space definition, a second NB-IoT UE cannot be scheduled while the NB-PDCCH transmission to a first NB-IoT UE is on-going. For the distributed kind, NB-PDCCH transmissions for several NB-IoT UEs can be multiplexed in the time domain. In a different example, this distributed approach can help address user blocking mainly when a UE with good channel conditions (e.g., the first UE) is "squeezed" within a large number of repetitions being transmitted to another UE (e.g., the second UE). It may be more beneficial to distribute the subframes for a UE in poor channel conditions that use more repetitions or higher aggregation levels (e.g. if aggregation levels are defined across subframes) so that other UEs, potentially with good channel conditions, can be addressed within the same set of transmissions as the UE with worse channel conditions. In one embodiment, distributed mapping of the NB-PDCCH in time-domain is used for UEs with a Maximum Coupling Loss (MCL) above a certain threshold or when the search space of NB-PDCCH candidates includes repetition (or aggregation) levels higher than a certain other threshold. These thresholds can be specified (e.g., MCL>154 dB or repetition level >16).

In yet another embodiment, NB-CCEs comprise the entire PRB similar to the aforementioned two embodiments. In some embodiments, in addition, they are further sub-divided into NB-REGs. In one example, one NB-REG comprises the resource elements on a single subcarrier in a given subframe. For example, assuming k=1, . . . , Nsc subcarriers per PRB, NB-REG k corresponds to resource elements (k,l) where k is the subcarrier index and l is the OFDM symbol within a subframe, l=0,1,2, . . . , Nsymb-1, where Nsymb is the number of OFDM symbols within a subframe. In another example, the NB-REG numbering is slightly altered and NB-REG k' corresponds to subcarrier index k for even k and NB-REG k' corresponds to subcarrier index Nsc−k for odd k, k=1,2 . . . , Nsc. This is also exemplified in Table 1 for Nsc=12.

TABLE 1

An example for NB-REG indexing and mapping to subcarriers

| k' | k |
|---|---|
| 0 | 0 |
| 1 | 11 |
| 2 | 2 |
| 3 | 9 |
| 4 | 4 |
| 5 | 7 |
| 6 | 6 |
| 7 | 5 |
| 8 | 8 |
| 9 | 3 |
| 10 | 10 |
| 11 | 1 |

Such an NB-REG definition may be beneficial if modulated NB-PDCCH symbols are mapped to the dc subcarrier of the OFDM waveform. A "time first" mapping can also be combined with Space Frequency Block Codes (SFBC) to harness additional transmit diversity. In one embodiment, the time-first mapping is performed in pairs of sub-carriers and SFBC is applied to these pairs. Within a pair, the symbols are first mapped in the frequency domain and then in the time domain (e.g., SFBC is performed on symbols of sub-carriers k=2*i+o for o={0,1} and i={0,1,2,3,4,5}). Alternatively. Table 1 can be adopted to support SFBC as exemplified in Table 2.

TABLE 2

An example for NB-REG indexing and mapping to subcarriers

| k' | k |
|---|---|
| 0 | 0 |
| 1 | 1 |
| 2 | 10 |
| 3 | 11 |
| 4 | 2 |
| 5 | 3 |
| 6 | 8 |
| 7 | 9 |
| 8 | 4 |
| 9 | 5 |
| 10 | 6 |
| 11 | 7 |

In some embodiments, in the above NB-REG definition, the number of NB-REGs is constant. In some such embodiments, the number of NB-REGs equals Nsc. When the NB-IoT carrier is deployed within the system bandwidth of a legacy LTE network, cell-specific signals and channels of the legacy LTE network are structured to be protected by the NB-IoT system. For example, NB-IoT signals and channels may not be mapped to the first one, two, or three OFDM symbols of a subframe where the legacy LTE system may transmit the legacy PDCCH. Similarly, resource elements used for transmission of CRS in the donor PRB (e.g., the PRB used for NB-IoT transmissions within the LTE system bandwidth) may be protected and cannot be used for transmission of NB-IoT signals and channels. NB-IoT UEs may be aware of such protected resources either by specification (e.g., for the legacy control region) or via signaling from the eNB providing the NB-IoT carrier. For example, the NB-IoT UE may infer the legacy CRS resources from detecting the Physical Cell ID from the NB-SSS transmission. Alternatively, the NB-PBCH may carry such information. In some embodiments, the NB-PBCH or the MIB transmitted on the NB-PBCH may also contain the PRB index of the NB-IoT carrier and the number of PBCH antenna ports of the legacy donor PRB. Alternatively, the number of PBCH antenna ports of the legacy donor PRB may be encoded in the CRC bits of the NB-PBCH by means of a scrambling mask. Once the NB-IoT UE has deterministically derived the protected resources, it can rate match the NB-PDCCH around these resources accordingly. For example, the NB-IoT UE may assume that resource elements defined by the NB-REGs of a NB-PDCCH candidate that collide with protected resources may not be used for NB-PDCCH transmissions. Assuming a NB-REG definition as in Table 1, NB-PDCCH symbols may be mapped to OFDM symbols starting after the OFDM symbols corresponding to legacy PDCCH transmissions for NB-IoT deployments in an in-band mode of operation. Similarly, REs used for legacy CRS and NB-RS and/or DMRS transmissions may be excluded from a NB-REG when the NB-PDCCH is mapped to physical resources.

In another embodiment, the number of REs within a NB-REG used for transmission of the NB-PDCCH is constant. For example, ine one embodiment one NB-REG may always comprise four REs to which the NB-PDCCH is mapped. In this example, the number of NB-REGs within a subframe will be different depending on the NB-IoT mode of operation (for in-band deployments, NB-REGs are not defined for the first one, two, or three OFDM symbols of a subframe corresponding to the LTE PDCCH region), the number of PBCH antenna ports in the legacy LTE donor cell (8, 16, or 24 REs are reserved for LTE CRS for 1, 2, 4 PBCH antenna ports, respectively) and the number of REs reserved for mapping of RS used to demodulate the NB-PDCCH.

In yet another embodiment, multiple NB-PDCCH may be multiplexed within one subframe. Such a multiplexing of NB-PDCCHs is based on the NB-REG and/or NB-CCE definitions, according to some embodiments herein. For example, one NB-CCE may be defined as four NB-REGs according to Table 1. Assuming 12 subcarriers per PRB, three NB-PDCCH can be multiplexed within the same subframe where one NB-CCE comprises four NB-REGs. Such a NB-REG to NB-CCE mapping is not meant to be construed in a limiting sense and other mappings are not precluded.

In various embodiments, the aforementioned NB-REG definitions can be combined. For example, the number of NB-REGs per subframe can by dynamic (e.g., as a function of the deployment mode and/or the number of reference signals used for demodulation of the NB-PDCCH), yet the NB-REGs may be punctured by other RS of which the NB-IoT UE may not be aware. For example, CSI-RS may puncture the NB-REGs from an eNB perspective, but the NB-IoT UE may not be aware of the respective CSI-RS configuration and thus does not take CSI-RS definitions into account when determining the number of NB-REGs within a subframe.

In yet another embodiment, the NB-REG and/or NB-CCE definition may depend on the mode of operation, which may be signaled by the NB-PSS. NB-SSS, or NB-PBCH.

In yet another embodiment, the search space definitions depend on the actual or assumed (from the NB-IoT UE perspective) number of available REs for NB-PDCCH transmission within one subframe. For example, if the number of actual or assumed REs for NB-PDCCH transmissions is less than a threshold T, then the minimum aggregation level is larger than for the case where the number of actual or assumed REs for NB-PDCCH transmissions is larger than a threshold T. In addition or alternatively, the threshold may depend on the DCI payload size for a given NB-PDCCH candidate. For example, for the in-band mode of operation, the minimum number of NB-CCEs per NB-PDCCH may be larger than for the guard-band or standalone mode of operation due to the loss of NB-PDCCH resources stemming from the protection of legacy channels and signals in the donor PRB.

In some embodiments, it is assumed that the NB-PDCCH search space candidates are defined using a pair of aggregation levels (ALs) and repetition levels (RLs) to monitor, wherein an AL is defined as the number of NB-CCEs used within a subframe to transmit an NB-PDCCH and an RL is defined as the number of subframes over which the NB-CCE(s) are repeated in a time dimension. Further, across the different repetitions in different subframes, the same NB-CCE location(s) can be used to transmit the NB-PDCCH (e.g., the NB-CCE(s) are the same as those used in the first subframe for the particular NB-PDCCH candidate). Alternatively, a permutation of the NB-CCE index could be applied as a function of the System Frame Number (SFN) and subframe index, wherein the permutation function is based on a hashing function. However, different definitions for ALs and/or RLs may be realized and, accordingly, the concepts disclosed next can be adapted.

In another embodiment, each NB-REG is formed by a maximum of four REs or, alternatively, formed by a maximum of six REs, with the actual number of REs used to carry NB-PDCCH in the NB-REG depending on the presence of LTE CRS and NB-RS within the NB-REG REs in the PRB-pair of the NB-IoT subframe. Thus, an NB-REG is represented by the index pair (k', l') of the resource element with the lowest index k in the group with all resource elements in the group having the same value of 1. The set of resource elements (k,l) in a resource-element group depends on the number of LTE cell-specific reference signals (LTE CRS) and Narrowband reference signals (NB-RS) configured. The indexing for k in (k,l) can be limited to range from 0 through 11, corresponding to the twelve subcarriers in a PRB of the NB-IoT subframe. Alternatively, indexing for k in (k,l) can be defined as the subcarrier indexing using for LTE PDCCH such the index of the NB-IoT PRB within the larger LTE system BW (for in-band operation mode), and a specified or configured (e.g., signaled via the NB-PDCCH) value, e.g., nPRB=0 (for stand-alone or guard-band operation modes). The REs in an NB-REG are mapped in a frequency-first mapping for NscNB-PDCCH subcarriers, where NscNB-PDCCH is the minimum number of subcarriers used for transmitting the NB-PDCCH. This value can depending on whether frequency-division multiplexing of multiple NB-PDCCH or NB-PDCCH and NB-PDCCH are supported within a PRB. For instance, NscNB-PDCCH=4 or NscNB-PDCCH=12 can be used when NB-REG is formed by a maximum of four REs, while NscNB-PDCCH=6 is used when NB-REG is formed by a maximum of six REs. That is, the NB-REG time index l' is incremented by 1 every NscNB-PDCCH subcarriers.

In some of the embodiments, the OFDM symbols for NB-PDCCH mapping and hence, the mapping of time index l' of the NB-REG, start after the LTE PDCCH symbols for in-band operation and can start from the first OFDM symbol (symbol 0) for stand-alone and guard-band operation modes. For in-band mode, the starting OFDM symbol for NB-PDCCH and NB-PDSCH can be configured semi-statically via the System Information Block (SIB) signaling defined for NB-IoT.

Using the above construction of NB-REG, a Narrowband Control Channel Element (NB-CCE) can be defined to be comprised of the NB-REGs within the NscNB-PDCCH subcarriers and the available OFDM symbols (excluding the LTE PDCCH symbols for in-band mode) of an NB-IoT subframe (assumed to be same as LTE subframe duration in this disclosure, but the concepts herein can be adapted for longer subframe durations for NB-IoT). This approach would be suitable especially when NscNB-PDCCH=4 or NscNB-PDCCH=6.

Alternatively, an NB-CCE can be defined to comprise a fixed number of NB-REGs (e.g., 9 NB-REGs) and in this case, the number of used NB-REGs in a subframe is known to the UE. This approach may be suitable when NscNB-PDCCH=12. For this case, if necessary, <NIL> elements are inserted in the block of bits prior to a scrambling operation to ensure that the NB-PDCCFstart at specific NB-CCE positions and that the length of the total number of bits transmitted for all the transmitted NB-PDCCH in the subframe=Q*nRENB-REG*NNB-REG, where Q=2 corresponds to a modulation order of QPSK, nRENB-REG indicates the maximum number of REs used to construct an NB-REG (e.g., 4 or 6 per the embodiments above), and NNB-REG is the number of NB-REGs used for NB-PDCCH transmission in a subframe. If NB-PDCCH and NB-PDSCH are not multiplexed in the same PRB pair of an NB-IoT subframe, then the value of NNB-REG can be determined as nREsubframe/nRENB-REG, where nREsubframe is the number of available REs (including those reserved for LTE CRS and NB-RS) excluding the LTE PDCCH symbols for in-band operation mode. When NscNB-PDCCH<12, then the above concepts can be adapted as well.

Following the first embodiment for NB-CCE construction, in further embodiments, an NB-REG is composed of a maximum of 4 REs and NscNB-PDCCH=4, and thereby, NB-CCE is defined to span X NB-REGs, where X is the number of OFDM symbols in the subframe used for NB-PDCCH transmission. In this case, a single NB-PDCCH can be transmitted using 4 subcarriers of a subframe when using a single NB-CCE, which is referred to as aggregation level (AL)=1 for NB-PDCCH transmission. Up to three NB-CCUs and up to three NB-PDCCH can be transmitted in a single subframe, thereby reducing the impact of user blocking for DL or UL scheduling. However, for such embodiments, considering the presence of LTE CRS with at least two DL antenna ports (APs) and/or NB-RS in the subframe, for subcarriers 0 through 3, up to 22.22% fewer REs may be available for the NB-CCE compared to the NB-CCE mapped to subcarriers 4-7 or subcarriers 8-11. This is due to the LTE CRS (similar RS pattern is assumed for NB-RS w.r.t. frequency domain location) being mapped to 4 subcarriers in a PRB for 2 or 4 APs.

In some further embodiments, to obtain evenly balanced available REs and effective coding rates for different NB- CCEs in a subframe, an NB-REG is composed of a maximum of 6 REs, and NscNB-PDCCH=6, and NB-CCE is defined to span X NB-REGs, where X is the number of OFDM symbols in the subframe used for NB-PDCCH transmission. In this case, up to two NB-CCEs and up to two NB-PDCCH can be transmitted within a subframe, and the number of REs in each NB-CCE would be the same, ranging from 50 REs (in-band with 3 symbols for LTE PDCCH, 4-port LTE CRS, and 2-port NB-RS) to 76 REs (stand-alone or guard-band with NB-PDCCH starting from symbol 0, and 2-port NB-RS). In some embodiments, for stand-alone or guard-band cases, the NB-RS can use similar structure and sequence design as LTE CRS with a specified PRB index.

In yet another embodiment, NB-REGs are not defined and instead NB-CCEs are directly defined such that the NB-PDCCH symbols are mapped in a frequency-first manner within the NscNB-PDCCH=4 or NscNB-PDCCH=6 subcarriers and the available OFDM symbols in the subframe. In this case, the symbol to resource element mapping is performed by skipping (i.e., rate-matching around) the REs reserved for LTE CRS and/or NB-RS.

Further, for some implementations of the above embodiments, for the NB-PDCCH construction using NB-REG definitions, the mapping of the NB-PDCCH symbols to the NB-REGs can follow the procedure described in Section 6.8.5 of 3GPP TS 36.211.

Thus, the eNB can transmit up to 3 or 2 NB-PDCCH (for NscNB-PDCCH=4 or 6 respectively) in a subframe. Additionally, a UE's search space can also include NB-PDCCH candidates using AL>1 (i.e., AL=2 or 3 wherein a single NB-PDCCH is transmitted using 2 or 3 NB-CCEs within a PRB pair). Thus, depending on the traffic and loading on the NB-PDCCH, the eNB can configure a UE with larger AL and smaller repetition levels (RLs) or vice-versa. While use of larger AU would benefit the UE in receiving the NB-PDCCH quickly, thereby aiding power consumption reduction, the latter, i.e., smaller ALs, can be used to multiplex multiple NB-PDCCH or NB-PDSCH in a PRB pair of an NB-IoT subframe.

For multiplexing with NB-PDSCH, similar to LTE EPD-CCH operation, a UE may not monitor for NB-PDCCH in the subcarrier set that has been scheduled for NB-PDSCH transmission to the UE. Further, for the case of NscNB-PDCCH=4 or 6, NB-PDCCH subcarrier sets or "NB-PDCCH sub-PRB sets" may be defined such that the UE would monitor a limited set of NB-PDCCH subcarrier sets or NB-PDCCH sub-PRBs in a particular subframe. This information can be provided to the UE as part of the UE-specific search space (USS) or common search space (CSS) configurations carried via dedicated RRC signaling or SIB signaling (for CSS, if CSS is defined for NB-IoT).

Such a design can enable the eNB to multiplex different coverage classes via FDM—e.g., using the NB-PDCCH sub-PRB sets of size 4 or 6 subcarriers (e. NscNB-PDCCH=4 or 6), the eNB can assign UEs in different coverage classes to monitor different sets of the subcarriers within a PRB.

In some embodiments, NB-PDCCH is defined using a combination of the concepts of NB-PDCCH sub-PRB sets, NB-REGs, and NB-CCEs as described above with the concepts described earlier including distributed mapping for NB-CCE definition.

Some of the embodiments herein can also be employed to address the aforementioned blocking issue among different NB-IoT UEs. In one embodiment, multiplexing of different NB-IoT UEs within a single subframe is used to address the blocking issue. In another embodiment, distributed NB-CCE definitions spanning more than one subframe can be used to multiplex multiple NB-PDCCHs in the time-domain according to the embodiments herein. In some embodiments, the blocking can be addressed by dynamically indicating the offset between the scheduling NB-PDCCH and the associated NB-PDSCH in the DCI. For example, the DCI may indicate an offset parameter p in the DCI indicating an associated NB-PDSCH is transmitted in subframe n±p where subframe n is a reference subframe known to the UE. Different trade-offs between scheduling flexibility and simplicity of the design can be achieved as follows in various embodiments. In some embodiments, a localized NB-CCE definition where one NB-CCE corresponds to one PRB and the DCI indicates a dynamic offset p is used. In some embodiments, a distributed NB-CCE definition where one NB-CCE corresponds to one PRB and the offset p is fixed by specification is used. In some embodiments, localized NB-CCE, definition where multiple NB-CCEs are defined in one PRB and the offset p is fixed by specification is used. In other embodiments, other such structures are used.

For UE-specific search spaces, the multiplexing of NB-PDCCH for different UEs with the same or different coverage classes can be realized in both frequency and time dimensions. This can be achieved via the search space configuration that includes UE-specific sets of (AL, RL) that UEs monitor for NB-PDCCH. Further, the starting subframe of the NB-PDCCH search space can be defined UE-specifically as a function of SFN, subframe number and considering the maximum repetition level (RL) used for any NB-PDCCH candidate for the UE's search space. Thus, the starting subframe of the USS should be such that the periodicity is long enough to accommodate the maximum RL for the NB-PDCCH candidate(s) in the search space.

In some embodiments, an NB-IoT UE can be configured to receive the NB-PDCCH on multiple NB-IoT carriers whereby each NB-IoT carrier has a RF bandwidth of 180 kHz corresponding to a single PRB assuming 15 kHz sub-carrier spacing of the Orthogonal Frequency-Division Multiplexing (OFDM) waveform; however, other numerologies are not precluded. In one embodiment, the NB-IoT UE is configured with said NB-IoT carriers in a UE-specific manner by the controlling eNB. For example, an NB-IoT UE may attach to an NB-IoT carrier by the aforementioned procedure comprising detection and subsequent decoding of the NB-PSS/SSS sequences and the NB-PBCH channel, respectively. After RRC connection establishment, the NB-IoT UE is configured with one or more NB-IoT carriers on which the NB-IoT begins to monitor for NB-PDCCH transmissions, according to some of the embodiments herein. Such a UE-specific RRC configuration may be performed separately for the common search space (CSS) and the UE-specific search space (USS). Alternatively, the NB-IoT UE monitors the CSS on the NB-IoT carrier on which it received the NB-PBCH, whereas the NB-IoT carrier(s) for transmission of NB-PDCCHs on the UE-specific search space are RRC configured. Similarly, the NB-IoT carrier(s) for reception of NB-PDSCHs may be RRC configured at the UE. In this example, the DCI would indicate on which NB-IoT carrier the NB-IoT UE decodes the associated NB-PDSCH.

In another embodiment, the NB-IoT carrier with NB-PSS/SSS and/or NB-PBCH broadcasts in the system information a set of candidate NB-IoT carriers for this "anchor carrier." The NB-IoT carriers for reception of NB-PDCCHs on the USS and/or CSS may be informed to the NB-IoT UE via dedicated RRC signaling, whereas NB-PDSCH transmissions are dynamically scheduled on these candidate NB-IoT carriers through indication in the DCI.

In yet another embodiment, the NB-IoT UE monitors one or more NB-IoT carriers for NB-PDCCH transmissions whereby which NB-IoT carrier to monitor is determined by the NB-IoT UE's coverage class. In one example, NB-IoT UEs in good coverage condition monitor NB-PDCCH transmissions according to the embodiments herein on one NB-IoT carrier, whereas NB-IoT UEs in extreme coverage condition monitor NB-PDCCH transmissions according to the embodiments herein on another NB-IoT carrier.

In yet another embodiment, the NB-IoT carrier with NB-PSS/SSS and/or NB-PBCH broadcasts in the system information (e.g., NB-SIB1) on which NB-IoT carrier the NB-IoT UE receives additional system information.

In some embodiments herein, the NB-IoT carriers may be configured by a frequency offset relative to the NB-IoT carrier with NB-PSS/SSS and/or NB-PBCH. Alternatively, the NB-IoT carriers may be configured using an indexing scheme. For example, when the multiple NB-IoT carriers are deployed within a single LTE system bandwidth, the PRB indexing of the LTE donor system may be used to configure the NB-IoT carriers.

Figure 3:
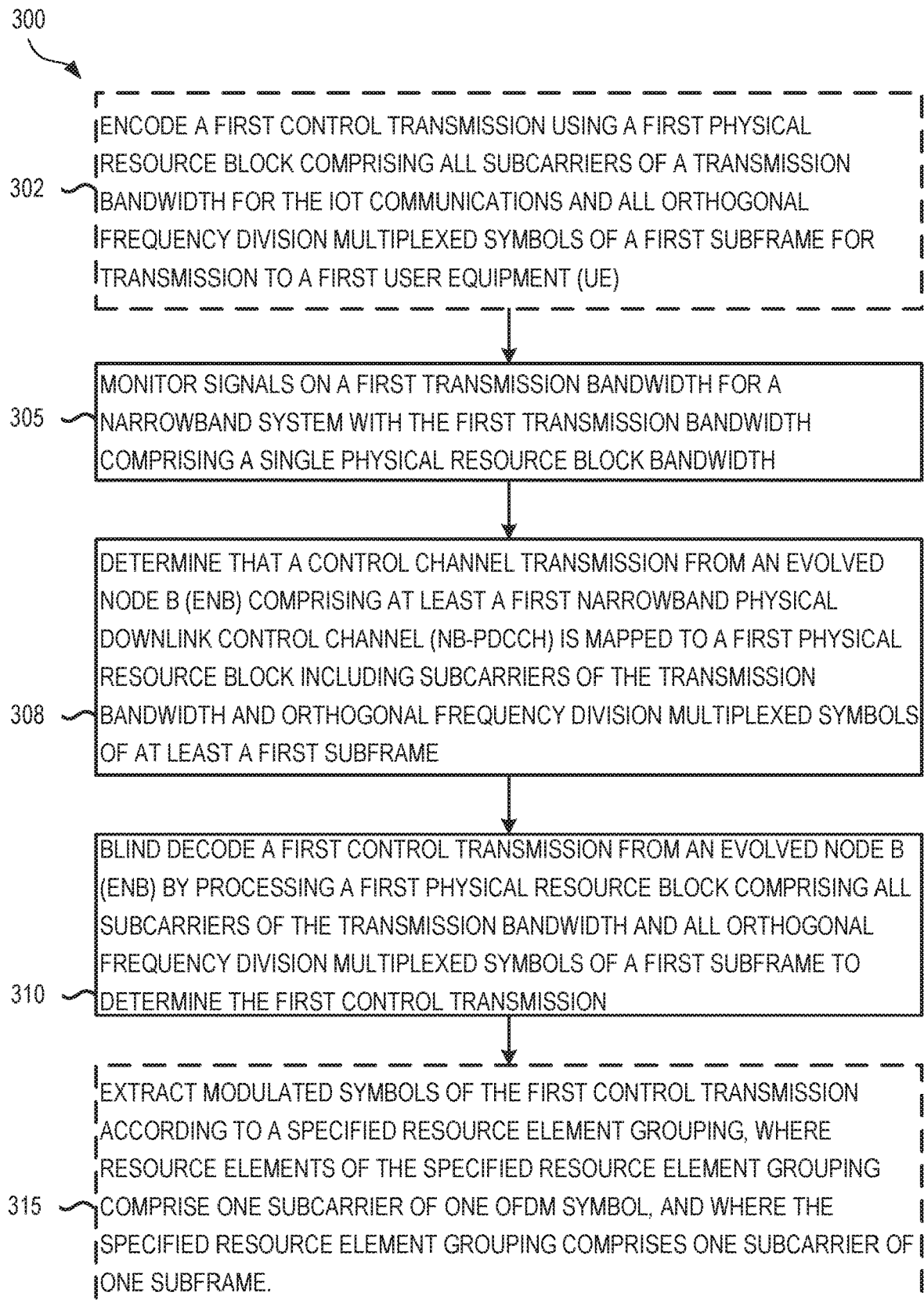
FIG. 3 illustrates a method for control channel communications in a narrowband (NB-IoT) system, in accordance with embodiments described herein.

In accordance with the above, FIG. 3 illustrates a method 300 for control channel communications in a NB-IoT system, in accordance with embodiments described herein. Method 300 describes operations 305, 308, 310, and 315 performed at a UE such as UE 102 or 201, mobile device 600, or machine 800, using signals generated in operation 302 at an eNB such as eNB 104 or 230. In various embodiments, the operations may be performed by processing circuitry of the corresponding device. Some embodiments comprise instructions in a storage medium that, when executed by processing circuitry, perform some or all of the described operations.

In some embodiments, operation 302 is a separate method performed by an apparatus of an evolved node B (eNB) for encoding control channel signals for narrowband Internet-of-Things (IoT) communications, with the apparatus comprising a memory and processing circuitry in communication with the memory and arranged to encode a first control transmission using a first physical resource block comprising all subcarriers of a transmission bandwidth for the IoT communications and all orthogonal frequency division multiplexed symbols of a first subframe for transmission to a first UE.

Operation 305, meanwhile, is performed by the UE, which monitors signals on the first transmission bandwidth. As described above, the UE monitors the transmission bandwidth and attempts to identify one or more repetitions of a control transmission. At some point during the monitoring, the UE receives the narrowband control channel transmission from the eNB, with the transmission mapped to the entire physical resource block comprising all subcarriers of the transmission bandwidth and all OFDM symbols of the subframe. In some embodiments, monitoring is on a first transmission bandwidth for a narrowband (e.g. IoT) system with the first transmission bandwidth comprising a single physical resource block bandwidth.

The UE determines that the control channel transmission from the eNB includes at least a first narrowband physical downlink control channel (NB-PDCCH) as a channel for communicating control signals that is mapped to a first physical resource block. This first physical resource block includes or otherwise covers all subcarriers of the transmission bandwidth for the narrowband configuration. This does not necessarily include all bandwidth of the system, but all bandwidth of the narrowband (IoT) operation for communicating between the UE and the eNB. The physical resource block further operates using orthogonal frequency division multiplexed symbols of at least a first subframe.

The UE then takes to the received transmission and blind decodes the first control channel transmission from the eNB in operation 310. In some embodiments, the decoding occurs through aggregation of multiple transmitted copies of the first physical resource block on the first transmission bandwidth. Such blocks may be consecutive or non-consecutive in the time domain in various embodiments.

Once the control transmission is decoded, the UE extracts modulated symbols of the first control transmission according to a specified resource element grouping in operation 315. Resource elements of the specified resource element grouping comprise one subcarrier of one OFDM symbol. In some embodiments, the resource element grouping comprises one subcarrier of one subframe.

Various alternative implementations of such a method may then be structured in different ways. In one alternative embodiment, the resource element grouping is defined such that modulated symbols of the control channel transmission are mapped to the dc subcarrier of the OFDM waveform, with the resource element grouping being defined in pairs of subcarriers whereby within each pair the modulated symbols are mapped frequency first and time second.

In another alternative embodiment, the resource element grouping is defined in pairs of subcarriers whereby within each pair modulated symbols are mapped frequency first and time second. In some such embodiments, the number of the resource element groups being fixed within one subframe and the number of resource elements in one resource element group are variable. In additional embodiments, the number of the resource element groups is variable within one subframe and the number of resource elements in one resource element group is fixed or variable. In still further embodiments, the UE excludes certain resources from the physical resource blocks.

Figure 4:
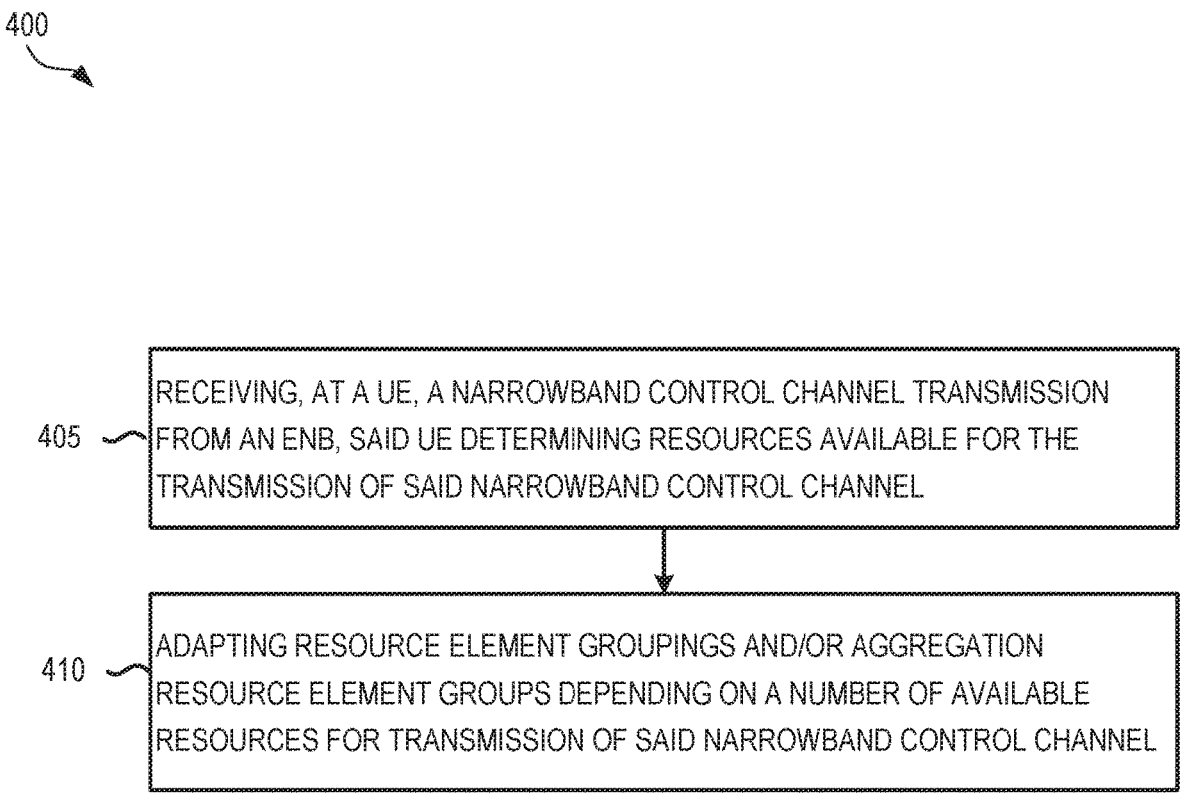
FIG. 4 illustrates a method for control channel communications in a NB-IoT system, in accordance with embodiments described herein.

FIG. 4 illustrates another method for control channel communications in a NB-IoT system, in accordance with embodiments described herein. Method 400 is performed by a UE or similar device and may be implemented as instructions in storage memory in various embodiments as described above.

In operation 405, said UE receives a narrowband control channel transmission from an eNB and determines the resources available for the transmission of said narrowband control channel.

In operation 410, said UE adapts the resource element grouping and/or the aggregation resource element groups depending on the number of available resources for the transmission of said narrowband control channel.

In various embodiments, method 400 may be performed with certain operations of method 300 at the same UE. In other embodiments, method 400 may be performed independently.

FIG. 5 illustrates another method for control channel communications in a NB-IoT system, in accordance with embodiments described herein. Method 500 is performed by a UE or similar device and may be implemented as instructions in storage memory in various embodiments as described above.

As part of method 500, a UE receives a narrowband control channel transmission from an eNB in operation 505. The UE in operation 505 then determines resources available for the transmissions of the narrowband control channel. In various embodiments, the transmission may be received on one carrier or on multiple narrowband carriers.

The UE then performs determination and/or adaptation operations in operation 510. As part of such operations, the UE may determine control channel characteristics, including the control channel starting symbol and/or subframe of the associated data transmission. The UE may adapt resource element groupings. The UE may also aggregate resource element groups. Such aggregation may depend on a number of available resources for transmission of the narrowband control channel.

In various implementations of such embodiments, the UE assumes that said control channel transmission is mapped to a subset of subcarriers of the transmission bandwidth on all OFDM symbols of the subframe. In some embodiments, the UE monitors a subset of subcarriers of the transmission bandwidth for possible control channel transmissions. In some embodiments, such a subset of subcarriers is signaled to the UE via system information broadcast or user equipment specific radio resource control signaling and/or said subset of subcarrier depending on the coverage class/level of said UE. In further embodiments, the UE attempts to decode said control channel transmission by aggregating multiple subsets of subcarriers within a subframe. In still further embodiments, the modulated symbols of said control channel transmission are mapped to said subsets of subcarriers in a frequency first and time second manner.

For embodiments where the UE receives narrowband control channel transmissions on multiple narrowband carriers, various different implementations may be used in different embodiments. In some such embodiments, the narrowband carriers are specifically configured by a user. Some such embodiments operate with a separate configuration for the user-specific and common search space. In other embodiments, the UE monitors a subset of subcarriers of the transmission bandwidth for possible control channel transmissions. In still further embodiments, the UE receives certain common control channel transmissions on a dedicated narrowband carrier.

Some embodiments operate where the control channel transmissions indicate to the UE on which narrowband carrier the UE is to receive associated data transmissions. In some embodiments, the narrowband carriers are broadcast in the system information, where the system information indicates that additional system information can be received on a separate narrowband carrier. In some embodiments, the narrowband carrier(s) depend on the UE's channel conditions.

In various implementations of the methods described above, and the variations and different implementations of the methods described above, particular operations may be repeated or performed in different orders in accordance with different embodiments. Additionally, the operations of different methods may be performed together or independently in any grouping. In particular, certain embodiments are performed with an individual UE performing all operations of the embodiment. Similarly, other embodiments are performed with an eNB performing all operations of the embodiment. A non-exhaustive list of example embodiments is detailed below.

EXAMPLE EMBODIMENTS

Example 1 may include a method comprising: receiving a narrowband control channel transmission from an eNB and assuming that said control channel transmission is mapped to an entire physical resource block comprising all subcarriers of the transmission bandwidth and all OFDM symbols of the subframe.

Example 2 may include a method of example 1 and/or other examples herein, further comprising: attempting to decode said control channel transmission by aggregating multiple physical resource blocks.

Example 3 may include a method of example 2 and/or other examples herein, further comprising: said multiple physical resource blocks being consecutive in the time-domain.

Example 4 may include a method of example 2 and/or other examples herein, further comprising: said multiple physical resource blocks not being consecutive in the time-domain.

Example 5 may include a method of example 1 and/or other examples herein, further comprising: extracting the modulated symbols of the control channel transmission according to a specified resource element grouping where a resource element comprises one subcarrier of one OFDM symbol.

Example 6 may include a method of example 5 and/or other examples herein, further comprising: said resource element grouping being defined as one subcarrier of one subframe.

Example 7 may include a method of example 6 and/or other examples herein, further comprising: said resource element grouping being defined such that modulated symbols of the control channel transmission are mapped to the dc subcarrier of the OFDM waveform.

Example 8 may include a method of example 6 and/or other examples herein, further comprising: said resource element grouping being defined in pairs of subcarriers whereby within each pair modulated symbols are mapped frequency first and time second.

Example 9 may include a method of example 7 and/or other examples herein, further comprising: said resource element grouping being defined in pairs of subcarriers whereby within each pair modulated symbols are mapped frequency first and time second.

Example 10 may include a method of example 1 and/or other examples herein, further comprising: excluding certain resources from the physical resource blocks.

Example 11 may include a method of example 5 and/or other examples herein, further comprising: the number of said resource element groups being fixed within one subframe and the number of resource elements in one resource element group being variable.

Example 12 may include a method of example 5 and/or other examples herein, further comprising: the number of said resource element groups being variable within one subframe and the number of resource elements in one resource element group being fixed.

Example 13 may include a method of example 5 and/or other examples herein, further comprising: the number of said resource element groups being variable within one subframe and the number of resource elements in one resource element group being variable.

Example 14 may include a method comprising: receiving a narrowband control channel transmission from an eNB; determining the resources available for the transmission of said narrowband control channel; and adapting the resource element grouping and/or the aggregation resource element groups depending on the number of available resources for the transmission of said narrowband control channel.

Example 15 may include a method comprising: receiving a narrowband control channel transmission from an eNB, with said control channel indicating to the UE the starting symbol and/or subframe of the associated data transmission.

Example 16 may include a method comprising: receiving a narrowband control channel transmission from an eNB and assuming that said control channel transmission is mapped to a subset of subcarriers of the transmission bandwidth on all OFDM symbols of the subframe.

Example 17 may include a method of example 16 and/or other examples herein, further comprising: monitoring a subset of subcarriers of the transmission bandwidth for possible control channel transmissions.

Example 18 may include a method of example 17 and/or other examples herein, further comprising: said subset being signaled via system information broadcast on UE specific radio resource control signaling.

Example 19 may include a method of example 17 and/or other examples herein, further comprising: said subset of subcarrier depending on the coverage class/level of said UE.

Example 20 may include a method of example 16 and/or other examples herein, further comprising: attempting to decode said control channel transmission by aggregating multiple subsets of subcarriers within a subframe.

Example 21 may include a method of example 16 and/or other examples herein, further comprising: modulated symbols of said control channel transmission being mapped to said subsets of subcarriers in a frequency first, time second manner.

Example 22 may include a method comprising: receiving narrowband control channel transmissions on multiple narrowband carriers.

Example 23 may include a method of example 22 and/or other examples herein, further comprising: said narrowband carriers being user specifically configured.

Example 24 may include a method of example 23 and/or other examples herein, further comprising: a separate configuration for the user-specific and common search space.

Example 25 may include a method of example 23 and/or other examples herein, further comprising: receiving certain common control channel transmissions on a dedicated narrowband carrier.

Example 26 may include a method of example 22 and/or other examples herein, further comprising: said control channel transmissions indicating on which narrowband carrier to receive associated data transmissions.

Example 27 may include a method of example 22 and/or other examples herein, further comprising: said narrowband carriers being broadcast in the system information.

Example 28 may include a method of example 22 and/or other examples herein, further comprising: the narrowband carrier(s) depending on channel conditions of a UE.

Example 29 may include a method of example 27 and/or other examples herein, further comprising: said system information indicating that additional system information can be received on a separate narrowband carrier.

Example 30 may include the method of any of examples 1-29, wherein the method is performed by a UE or a portion thereof.

Example 31 may include the method of any of examples 1-29, wherein the method is performed by an eNB or a portion thereof.

Example 32 may include inferring legacy Cell-Specific Reference Signal resources from a detected Physical Cell ID.

Example 33 may include example 32, wherein the inference is based on a narrowband secondary synchronization signal.

Example 34 may include any of example 32 or 33, wherein, after deterministically deriving the protected resources, rate matching narrowband Physical Downlink Control Channels.

Example 35 may include any of examples 1 to 34 or any other example herein, wherein the number of Resource Elements within a Narrowband Resource Element Group used for transmission of the Narrowband Physical Downlink Control Channels is constant.

Example 36 may include any of examples 1 to 35 or any other example herein, wherein multiple Narrowband Physical Downlink Control Channels are multiplexed within one subframe.

Example 37 may include any of examples 1 to 36 or any other example herein, wherein a narrowband resource element group and/or narrowband control channel element definition may depend on a mode of operation signaled by a narrowband primary synchronization signal, secondary synchronization signal, or physical broadcast channel.

Example 38 may include any of examples 1 to 37 or any other example herein, wherein one narrowband control channel element corresponds to one physical resource block pair and/or wherein multiple narrowband physical downlink control channels are multiplexed in a time-division multiplexing manner.

Example 39 may include any of examples 1 to 38 or any other example herein, wherein narrowband control channel elements comprise the entire physical resource block.

Example 40 may include example 39, wherein the narrowband control channel elements are further sub-divided into narrowband resource element groups.

Example 41 may include example 40, wherein one narrowband resource element group comprises resource elements on a single subcarrier in a given subframe.

Example 41 may include example 40, wherein modulated multiple narrowband physical downlink control channels are mapped to the dc subcarrier of the OFDM waveform.

Example 42 may include example 41, wherein a first-time mapping is performed in pairs of sub-carriers and space frequency block codes are applied to these pairs.

Example 43 may include an apparatus comprising radio frequency (RF) circuitry to receive a signal and baseband circuitry coupled with the RE circuitry, with the baseband circuitry to process the signal; which apparatus is configured to perform the method of any one of Example 1 to Example 42.

Example 44 may include one or more non-transitory computer-readable media comprising instructions to cause an electronic device, upon execution of the instructions by one or more processors of the electronic device, to perform one or more elements of a method described in or related to any of examples 1-42, or any other method or process described herein.

Example 45 may include an apparatus comprising logic, modules, and/or circuitry to perform one or more elements of a method described in or related to any of examples 1-42, or any other method or process described herein.

Example 46 may include a method, technique, or process as described in or related to any of examples 1-42, or portions or parts thereof.

Example 47 may include an apparatus comprising: one or more processors and one or more computer readable media comprising instructions that, when executed by the one or more processors, cause the one or more processors to perform the method, techniques, or process as described in or related to any of examples 1-42, or portions thereof.

Example 48 may include a method of communicating in a wireless network as shown and described herein.

Example 49 may include a system for providing wireless communication as shown and described herein.

Example 50 may include a device for providing wireless communication as shown and described herein.

Example 51 is an apparatus of a UE for narrowband Internet-of-Things (IoT) communication, the apparatus comprising: a memory; and processing circuitry in communication with the memory and arranged to: monitor signals on a first transmission bandwidth for a narrowband system with the first transmission bandwidth comprising a single physical resource block bandwidth; determine that a control channel transmission from an evolved node B (eNB) comprising at least a first narrowband physical downlink control channel (NB-PDCCH) is mapped to a first physical resource block including subcarriers of the transmission bandwidth and orthogonal frequency division multiplexed symbols of at least a first subframe; and blind decode the first control transmission comprising the NB-PDCCH by processing a first physical resource block including the subcarriers of the transmission bandwidth and the orthogonal frequency division multiplexed symbols of the first subframe to determine the first control transmission.

In Example 52, the subject matter of Example 51 optionally includes wherein the processing circuitry is further configured to blind decode the first control transmission from the eNB by processing a plurality of first physical resource blocks, the plurality of physical resource blocks comprising the first physical resource block, each physical resource block of the plurality of resource blocks comprising all subcarriers of the transmission bandwidth for corresponding time periods.

In Example 53, the subject matter of Example 52 optionally includes wherein the corresponding time periods for the plurality of physical resource blocks are consecutive in the time domain.

In Example 54, the subject matter of any one or more of Examples 52-53 optionally include wherein the corresponding time periods for the plurality of physical resource blocks are not all consecutive in the time domain.

In Example 55, the subject matter of any one or more of Examples 52-54 optionally include wherein the processing circuitry is further configured to extract modulated symbols of the first control transmission according to a specified resource element grouping.

In Example 56, the subject matter of Example 55 optionally includes wherein a subcarrier of one orthogonal frequency division multiplexed symbol comprises a resource element of the specified resource element grouping.

In Example 57, the subject matter of any one or more of Examples 55-56 optionally includes wherein the specified resource element grouping comprises a first subcarrier of a first subframe.

In Example 58, the subject matter of Example 57 optionally includes wherein the specified resource element grouping further comprises modulated symbols of the control channel transmission mapped to a direct current (DC) subcarrier of an OFDM waveform.

In Example 59, the subject matter of any one or more of Examples 57-58 optionally includes wherein the specified resource element grouping comprises pairs of subcarriers, each pair of subcarriers comprising modulated symbols with a first mapped frequency and a second mapped time.

In Example 60, the subject matter of any one or more of Examples 56-59 optionally includes, wherein the specified resource element grouping comprises a plurality of resource element groups, wherein the plurality of resource element groups is fixed in number within a first subframe and wherein the number of resource elements within each resource element group of the plurality of resource element groups is variable.

In Example 61, the subject matter of any one or more of Examples 56-60 optionally includes, wherein the specified resource element grouping comprises a plurality of resource element groups, wherein the plurality of resource element groups is variable in number within a first subframe and wherein the number of resource elements within each resource element group of the plurality of resource element groups is fixed.

In Example 62, the subject matter of any one or more of Examples 56-61 optionally includes, wherein the specified resource element grouping comprises a plurality of resource element groups, wherein the plurality of resource element groups is variable in number within a first subframe and wherein the number of resource elements within each resource element group of the plurality of resource element groups is variable.

In Example 63, the subject matter of any one or more of Examples 51-62 optionally includes further comprising: an antenna coupled to the processing circuitry, the antenna configured to receive the signals on the first transmission bandwidth and transmit the signals to the processing circuitry.

Example 64 is a computer-readable storage medium that stores instructions for execution by one or more processors of a UE, the one or more processors to configure the UE to: monitor signals on a first transmission bandwidth; blind decode a first control transmission from an evolved node B (eNB) by processing a first physical resource block comprising all subcarriers of the transmission bandwidth and all orthogonal frequency division multiplexed symbols of a first subframe to determine the first control transmission, wherein first control transmission is further decoded according to a specified resource element grouping.

In Example 65, the subject matter of Example 64 optionally includes wherein a subcarrier of one orthogonal frequency division multiplexed symbol comprises a resource element of the specified resource element grouping.

In Example 66, the subject matter of Example 65 optionally includes wherein the specified resource element grouping comprises a first subcarrier of a first subframe; and wherein the specified resource element grouping further comprises modulated symbols of the control channel transmission mapped to a direct current (DC) subcarrier of an OFDM waveform.

In Example 67, the subject matter of any one or more of Examples 65-66 optionally includes wherein the specified resource element grouping comprises pairs of subcarriers, each pair of subcarriers comprising modulated symbols with a first mapped frequency and a second mapped time.

In Example 68, the subject matter of any one or more of Examples 65-67 optionally includes, wherein the specified resource element grouping comprises a plurality of resource element groups, wherein the plurality of resource element groups is fixed in number within a first subframe and wherein the number of resource elements within each resource element group of the plurality of resource element groups is variable.

In Example 69, the subject matter of any one or more of Examples 65-68 optionally includes, wherein the specified resource element grouping comprises a plurality of resource element groups, wherein the plurality of resource element groups is variable in number within a first subframe and wherein the number of resource elements within each resource element group of the plurality of resource element groups is variable.

Example 70 is an apparatus of an evolved node B (eNB) for encoding control channel signals for narrowband Internet-of-Things (IoT) communications, the apparatus comprising: a memory; and processing circuitry in communication with the memory and arranged to: encode a first control transmission using a first physical resource block comprising all subcarriers of a transmission bandwidth for the IoT communications and all orthogonal frequency division multiplexed symbols of a first subframe for transmission to a first UE.

In Example 71, the subject matter of Example 70 optionally includes wherein the processing circuitry is further configured to encode the first control transmission from the eNB to the UE using a plurality of physical resource blocks, the plurality of physical resource blocks comprising the first physical resource block, each physical resource block of the plurality of resource blocks comprising all subcarriers of the transmission bandwidth for corresponding time periods.

In Example 72, the subject matter of Example 71 optionally includes wherein the corresponding time periods for the plurality of physical resource blocks are not all consecutive in the time domain.

In Example 73, the subject matter of any one or more of Examples 71-72 optionally includes wherein the processing circuitry is further configured to encode the first control transmission according to specified resource element groupings comprising a plurality of resource element groups, each resource element group of the plurality of resource element groups comprising one or more resource elements.

In Example 74, the subject matter of Example 73 optionally includes wherein the specified resource element grouping comprises a first subcarrier of a first subframe; and wherein the specified resource element grouping further comprises modulated symbols of the control channel transmission mapped to a direct current (DC) subcarrier of an OFDM waveform.

In Example 75, the subject matter of any one or more of Examples 71-74 optionally includes, wherein the plurality of resource element groups are fixed in number within a first subframe and wherein the number of resource elements within each resource element group of the plurality of resource element groups is variable.

Example 76 is an apparatus of a user equipment (UE) for narrowband Internet-of-Things (NB-IoT) communication, the apparatus comprising: processor means for monitoring signals on a first transmission bandwidth for a narrowband system with the first transmission bandwidth comprising a single physical resource block bandwidth; processor means for determining that a control channel transmission from an evolved node B (eNB) comprising at least a first narrowband physical downlink control channel (NB-PDCCH) is mapped to a first physical resource block including subcarriers of the transmission bandwidth and orthogonal frequency division multiplexed symbols of at least a first subframe; and processor means for blind decoding the first control transmission comprising the NB-PDCCH by processing a first physical resource block including the subcarriers of the transmission bandwidth and the orthogonal frequency division multiplexed symbols of the first subframe to determine the first control transmission.

In Example 77, the subject matter of Example 76 optionally includes, wherein the first control transmission from the eNB by processing a plurality of physical resource blocks, the plurality of physical resource blocks comprising the first physical resource block, each physical resource block of the plurality of resource blocks comprising all subcarriers of the transmission bandwidth for corresponding time periods.

In Example 78, the subject matter of Example 77 optionally includes, wherein the corresponding time periods for the plurality of physical resource blocks are consecutive in time domain.

In Example 79, the subject matter of any one or more of Examples 77-78 optionally include, wherein the corresponding time periods for the plurality of physical resource blocks are not all consecutive in time domain.

In Example 80, the subject matter of any one or more of Examples 77-79 optionally include, wherein the processing circuitry is further configured to extract modulated symbols of the first control transmission according to a specified resource element grouping.

In Example 81, the subject matter of Example 80 optionally includes, wherein a subcarrier of one orthogonal frequency division multiplexed symbol comprises a resource element of the specified resource element grouping.

Example 82 is a method performed by an apparatus of a user equipment (UE), the method comprising: monitoring signals on a first transmission bandwidth for a narrowband system with the first transmission bandwidth comprising a single physical resource block bandwidth; determining that a control channel transmission from an evolved node B (eNB) comprising at least a first narrowband physical downlink control channel (NB-PDCCH) is mapped to a first physical resource block including subcarriers of the transmission bandwidth and orthogonal frequency division multiplexed symbols of at least a first subframe; and blind decoding the first control transmission comprising the NB-PDCCH by processing a first physical resource block including the subcarriers of the transmission bandwidth and the orthogonal frequency division multiplexed symbols of the first subframe to determine the first control transmission.

In Example 83, the subject matter of Example 82 optionally includes, wherein a subcarrier of one orthogonal frequency division multiplexed symbol comprises a resource element of the specified resource element grouping.

In Example 84, the subject matter of Example 83 optionally includes, wherein the specified resource element grouping comprises a first subcarrier of a first subframe; and wherein the specified resource element grouping further comprises modulated symbols of the control channel transmission mapped to a direct current (DC) subcarrier of an orthogonal frequency division multiplexing (OFDM) waveform.

In Example 85, the subject matter of Example 84 optionally includes, wherein the specified resource element grouping comprises pairs of subcarriers, each pair of subcarriers comprising modulated symbols with a first mapped frequency and a second mapped time.

In Example 86, the subject matter of any one or more of Examples 84-85 optionally include, wherein the specified resource element grouping comprises a plurality of resource element groups, wherein the plurality of resource element groups are fixed in number within a first subframe; and wherein the number of resource elements within each resource element group of the plurality of resource element groups is variable.

In Example 87, the subject matter of any one or more of Examples 84-86 optionally include, wherein the specified resource element grouping comprises a plurality of resource element groups, wherein the plurality of resource element groups are variable in number within a first subframe; and wherein the number of resource elements within each resource element group of the plurality of resource element groups is variable.

Example 88 is an apparatus of an evolved node B (eNB) for encoding control channel signals for narrowband Internet-of-Things (IoT) communications, the apparatus comprising: means for encoding a first control transmission using a first physical resource block comprising all subcarriers of a transmission bandwidth for the IoT communications and all orthogonal frequency division multiplexed symbols of a first subframe for transmission to a first user equipment (UE).

In Example 89, the subject matter of Example 88 optionally includes, wherein the the first control transmission from the eNB to the UE is encoded using a plurality of physical resource blocks, the plurality of physical resource blocks comprising the first physical resource block, each physical resource block of the plurality of resource blocks comprising all subcarriers of the transmission bandwidth for corresponding time periods.

In Example 90, the subject matter of Example 89 optionally includes, wherein the corresponding time periods for the plurality of physical resource blocks are not all consecutive in the time domain.

In Example 91, the subject matter of any one or more of Examples 89-90 optionally include, wherein the processing circuitry is further configured to encode the first control transmission according to specified resource element groupings comprising a plurality of resource element groups, each resource element group of the plurality of resource element groups comprising one or more resource elements.

Example 92 is a method performed by an evolved Node B (eNB) in a communication system, the method comprising: encoding a control channel transmission for a first user equipment (UE), the control channel transmission comprising at least a first narrowband physical downlink control channel (NB-PDCCH) is mapped to a first physical resource block including subcarriers of the transmission bandwidth and orthogonal frequency division multiplexed symbols of at least a first subframe for blind decoding at the UE via processing a first physical resource block including the subcarriers of the transmission bandwidth and the orthogonal frequency division multiplexed symbols of the first subframe to determine the first control transmission; and initiate transmission of the NB-PDCCH to the first UE.

In Example 93, the subject matter of Example 92 optionally includes wherein the first control transmission is encoded according to specified resource element groupings comprising a plurality of resource element groups, each resource element group of the plurality of resource element groups comprising one or more resource elements; wherein the specified resource element grouping comprises a first subcarrier of a first subframe; and wherein the specified resource element grouping further comprises modulated symbols of the control channel transmission mapped to a direct current (DC) subcarrier of an orthogonal frequency division multiplexing (OFDM) waveform.

In Example 94, the subject matter of any one or more of Examples 92-93 optionally include, wherein the plurality of resource element groups are fixed in number within a first subframe; and wherein the number of resource elements within each resource element group of the plurality of resource element groups is variable.

Figure 6:
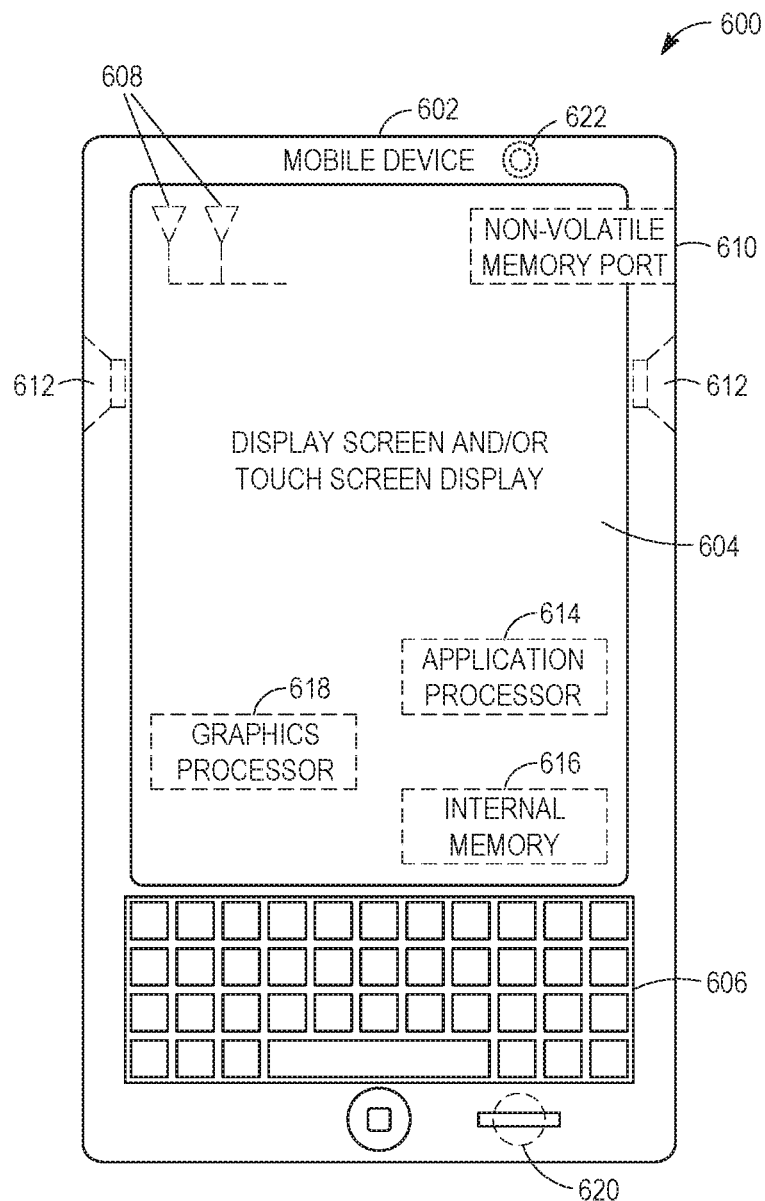
FIG. 6 illustrates aspects of a UE, in accordance with some example embodiments.

FIG. 6 shows an example UE, illustrated as a UE 600. The UE 600 may be an implementation of the UE 82, or any device described herein. The UE 600 can include one or more antennas 608 configured to communicate with a transmission station, such as a base station (BS), an eNB, or another type of wireless wide area network (WWAN) access point. The UE 600 can be configured to communicate using at least one wireless communication standard including 3GPP LTE, WiMAX, High Speed Packet Access (HSPA), Bluetooth, and WiFi. The UE 600 can communicate using separate antennas for each wireless communication standard or shared antennas for multiple wireless communication standards. The UE 600 can communicate in a WLAN, a wireless personal area network (WPAN), and/or a WWAN.

FIG. 6 also shows a microphone 620 and one or more speakers 612 that can be used for audio input and output to and from the UE 600. A display screen 604 can be a liquid crystal display (LCD) screen, or another type of display screen such as an organic light emitting diode (OLED) display. The display screen 604 can be configured as a touch screen. The touch screen can use capacitive, resistive, or another type of touch screen technology. An application processor 614 and a graphics processor 618 can be coupled to an internal memory 616 to provide processing and display capabilities. A non-volatile memory port 610 can also be used to provide data I/O options to a user. The non-volatile memory port 610 can also be used to expand the memory capabilities of the UE 600. A keyboard 606 can be integrated with the UE 600 or wirelessly connected to the UE 600 to provide additional user input. A virtual keyboard can also be provided using the touch screen. A camera 622 located on the front (display screen) side or the rear side of the UE 600 can also be integrated into a housing 602 of the UE 600.

Figure 7:
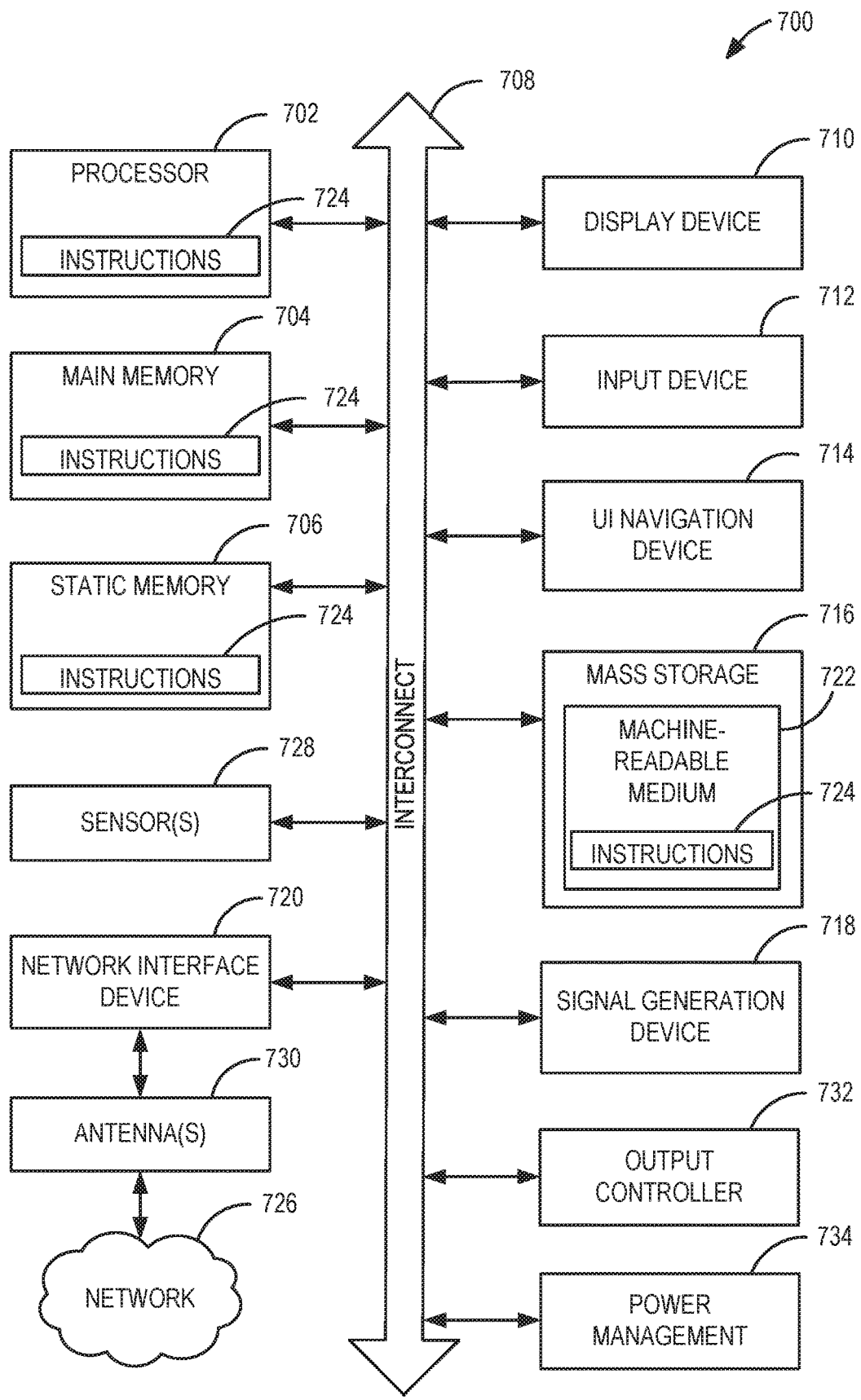
FIG. 7 is a block diagram illustrating an example computer system machine which may be used in association with various embodiments described herein.

FIG. 7 is a block diagram illustrating an example computer system machine 700 upon which any one or more of the methodologies herein discussed can be run, and which may be used to implement the eNB 84, the UE 82, or any other device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, a network switch, a network bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 700 includes a processor 702. (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a video display unit 710, an alphanumeric input device 712 (e.g., a keyboard), and a user interface (UI) navigation device 714 (e.g., a mouse). In one embodiment, the video display unit 710, alphanumeric input device 712, and UI navigation device 714 are a touch screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a GPS sensor, compass, location sensor, accelerometer, or other sensor.

The mass storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, static memory 706, and/or processor 702 during execution thereof by the computer system machine 700, with the main memory 704, the static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., hypertext transfer protocol (HTTP)). The term "transmission medium" shall be taken to include any medium that is capable of storing, encoding, or carrying instructions for execution by the machine, and includes digital or analog communications signals or other intangible media to facilitate communication of such software.

Various techniques, or certain aspects or portions thereof, may take the form of program code (i.e., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a Random Access Memory (RAM), Erasable Programmable Read-Only Memory (EPROM), flash drive, optical drive, magnetic hard drive, or other medium for storing electronic data. The eNB and UE may also include a transceiver module, a counter module, a processing module, and/or a clock module or timer module. One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, institute of Electrical and Electronic Engineers (IEEE) 702.11, and Bluetooth communication standards. Various alternative embodiments may use a variety of other WWAN, WLAN, and WPAN protocols and standards in connection with the techniques described herein. These standards include, but are not limited to, other standards from 3GPP HSPA+, UMTS), IEEE 702.16 (e.g., 702.16p), or Bluetooth (e.g., Bluetooth 6.0, or like standards defined by the Bluetooth Special Interest Group) standards families. Other applicable network configurations can be included within the scope of the presently described communication networks. It will be understood that communications on such communication networks can be facilitated using any number of personal area networks (PANS), local area networks (LANs), and wide area networks (WANs), using any combination of wired or wireless transmission mediums.

Figure 8:
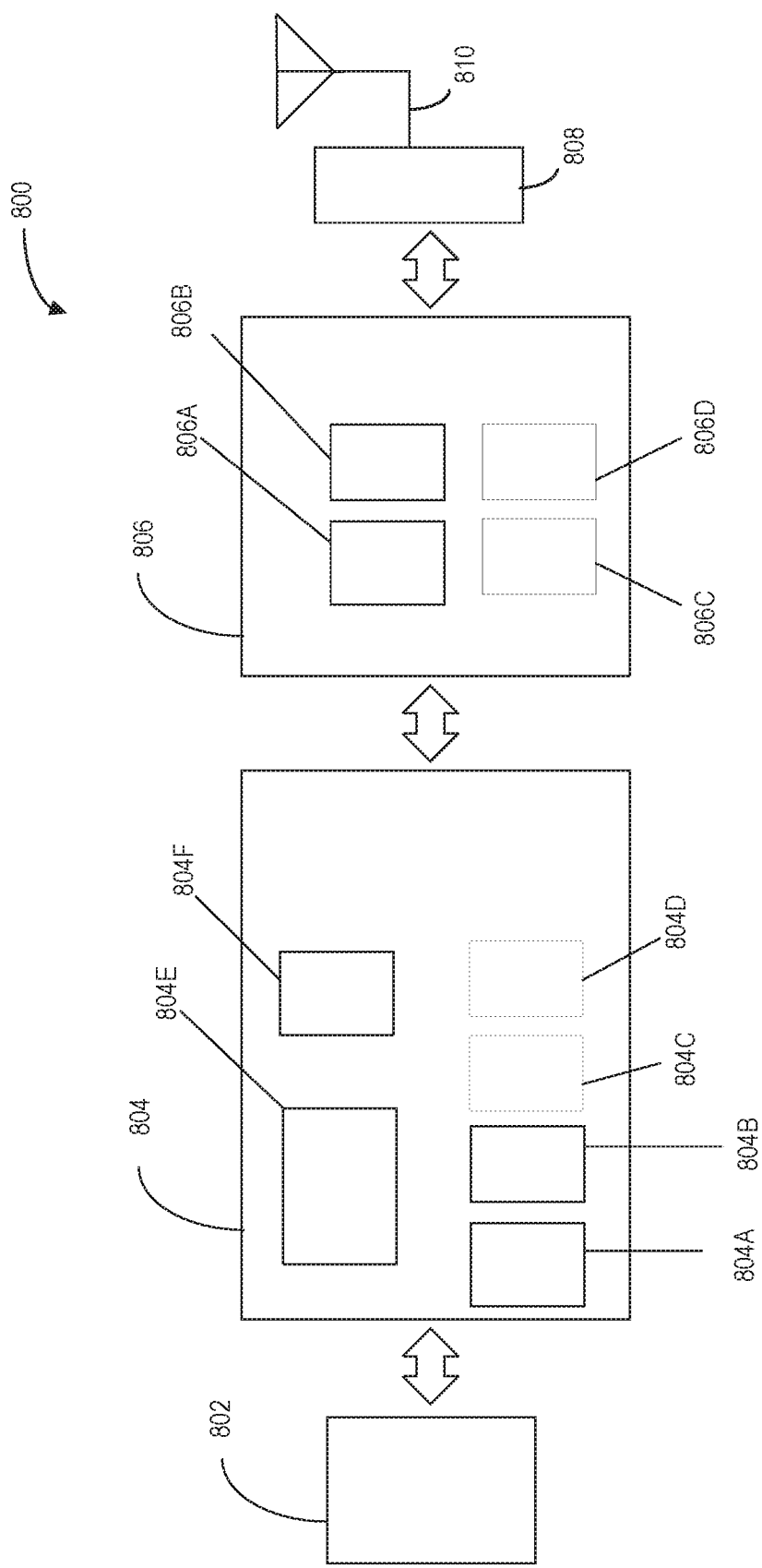
FIG. 8 illustrates aspects of a UE, in accordance with some example embodiments.

Embodiments described herein may be implemented into a system using any suitably configured hardware and/or software. FIG. 8 illustrates components of a UE 800, in accordance with some embodiments. At least some of the components shown may be used in the UE 82 (or eNB 84) shown in FIG. 1. The UE 800 and other components may be configured to use the synchronization signals as described herein. The UE 800 may be one of the UEs 82 shown in FIG. 1 and may be a stationary, non-mobile device or may be a mobile device. In some embodiments, the UE 800 may include application circuitry 802, baseband circuitry 804, Radio Frequency (RF) circuitry 806, front-end module (FEM) circuitry 808, and one or more antennas 810, coupled together at least as shown. At least some of the baseband circuitry 804, RF circuitry 806, and FEM circuitry 808 may form a transceiver. In some embodiments, other network elements, such as the eNB 84, may contain some or all of the components shown in FIG. 8. Other of the network elements, such as the MME, may contain an interface, such as the S1 interface, to communicate with the eNB over a wired connection regarding the UE 800.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the UE 800.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. The baseband circuitry 804 may interface with the application circuitry 802 for generation and processing of the baseband signals and for controlling operations of the RF circuitry 806. For example, in some embodiments, the baseband circuitry 804 may include a second generation (2G) baseband processor 804*a*, third generation (3G) baseband processor 804*b*, fourth generation (4G) baseband processor 804*c*, and/or other baseband processor(s) 804*d* for other existing generations, generations in development, or generations to be developed in the future (e.g., fifth generation (5G), etc.). The baseband circuitry 804 (e.g., one or more of the baseband processors

804*a-d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include FFT, preceding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PUY), media access control (MAC), radio link control (RLC), packet data convergence protocol (PDCP), and/or radio resource control (RRC) elements. A central processing unit (CPU) 804*e* of the baseband circuitry 804 may be configured to run elements of the protocol stack for signaling of the PHY, MAC, RLC, PDCP, and/or RRC layers. In some embodiments, the baseband circuitry 804 may include one or more audio digital signal processor(s) (DSPs) 804*f*. The audio DSP(s) 804*f* may be or include elements for compression/decompression and echo cancellation and may include other suitable processing elements in other embodiments. Components of the baseband circuitry 804 may be suitably combined in a single chip or a single chipset, or disposed on a same circuit board in some embodiments. In some embodiments, some or all of the constituent components of the baseband circuitry 804 and the application circuitry 802 may be implemented together, such as, for example, on a system on a chip (SOC).

In some embodiments, the baseband circuitry 804 may provide for communication compatible with one or more radio technologies. For example, in some embodiments, the baseband circuitry 804 may support communication with an EUTRAN and/or other wireless metropolitan area networks (WMAN), a WLAN, or a WPAN. Embodiments in which the baseband circuitry 804 is configured to support radio communications of more than one wireless protocol may be referred to as multi-mode baseband circuitry. In some embodiments, the UE 800 can be configured to operate in accordance with communication standards or other protocols or standards, including Institute of Electrical and Electronic Engineers (IEEE) 602.16 wireless technology (WiMax), IEEE 602.11 wireless technology (WiFi) including IEEE 602.11 ad, which operates in the 60 GHz millimeter wave spectrum, or various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, and the like technologies either already developed or to be developed.

The RF circuitry 806 may enable communication with wireless networks using modulated electromagnetic radiation through a non-solid medium. In various embodiments, the RE circuitry 806 may include switches, filters, amplifiers, and the like to facilitate the communication with the wireless network. The RF circuitry 806 may include a receive signal path, which may include circuitry to down-convert RF signals received from the FEM circuitry 808 and provide baseband signals to the baseband circuitry 804. The RF circuitry 806 may also include a transmit signal path, which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806*a*, amplifier circuitry 806*b*, and filter circuitry 806*c*. The transmit signal path of the RF circuitry 806 may include the filter circuitry 806*c* and the mixer circuitry 806*a*. The RF circuitry 806 may also include synthesizer circuitry 806*d* for synthesizing a frequency for use by the mixer circuitry 806*a* of the receive signal path and the transmit signal path. In some embodiments, the mixer circuitry 806*a* of the receive signal path may be configured to down-convert RF signals received from the FEM circuitry 808 based on the synthesized frequency provided by the synthesizer circuitry 806*d*. The amplifier circuitry 806*b* may be configured to amplify the down-converted signals, and the filter circuitry 806*c* may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 806*a* of the receive signal path may comprise passive mixers, although the scope of the embodiments is not limited in this respect.

In some embodiments, the mixer circuitry 806*a* of the transmit signal path may be configured to up-convert input baseband signals based on the synthesized frequency provided by the synthesizer circuitry 806*d* to generate RF output signals for the FEM circuitry 808. The baseband signals may be provided by the baseband circuitry 804 and may be filtered by the filter circuitry 806*c*. The filter circuitry 806*c* may include a low-pass filter (LPF), although the scope of the embodiments is not limited in this respect.

In some embodiments, the mixer circuitry 806*a* of the receive signal path and the mixer circuitry 806*a* of the transmit signal path may include two or more mixers and may be arranged for quadrature downconversion and/or upconversion respectively. In some embodiments, the mixer circuitry 806*a* of the receive signal path and the mixer circuitry 806*a* of the transmit signal path may include two or more mixers and may be arranged for image rejection (e.g., Hartley image rejection). In some embodiments, the mixer circuitry 806*a* of the receive signal path and the mixer circuitry 806*a* of the transmit signal path may be arranged for direct downconversion and/or direct upconversion, respectively. In some embodiments, the mixer circuitry 806*a* of the receive signal path and the mixer circuitry 806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect, as other types of frequency synthesizers may be suitable. For example, the synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

The synthesizer circuitry 806d of the RF circuitry 806 may include a divider, a delay-locked loop (DLL), a multiplexer, and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 806 may include an IQ/polar converter.

The FEM circuitry 808 may include a receive signal path, which may include circuitry configured to operate on RF signals received from the one or more antennas 810, amplify the received signals, and provide the amplified versions of the received signals to the RF circuitry 806 for further processing. The FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a Tx/Rx switch to switch between transmit mode and receive mode operation. The FEM circuitry 808 may include a receive signal path and a transmit signal path. The receive signal path of the FEM circuitry 808 may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by the RF circuitry 806), and one or more filters to generate RF signals for subsequent transmission (e.g., by one or more of the one or more antennas 810).

In some embodiments, the UE 800 may include additional elements such as, for example, a memory/storage, display, camera, sensor, and/or input/output (I/O) interface as described in more detail below. In some embodiments, the UE 800 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or another device that may receive and/or transmit information wirelessly. In some embodiments, the UE 800 may include one or more user interfaces designed to enable user interaction with the system and/or peripheral component interfaces designed to enable peripheral component interaction with the system. For example, the UE 800 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 810 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 810 may be effectively separated to take advantage of spatial diversity and the different channel characteristics that may result.

Although the UE 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

While the communication device-readable medium is illustrated as a single medium, the term "communication device-readable medium" may include a single medium or multiple media (e.g., a centralized or distributed database, and/or associated caches and servers) configured to store the one or more instructions.

The term "communication device-readable medium" may include any medium that is capable of storing, encoding, or carrying instructions for execution by the communication device and that cause the communication device to perform any one or more of the techniques of the present disclosure, or that is capable of storing, encoding, or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., EPROM. Electrically Erasable Programmable Read-Only Memory (EEPROM)) and flash memory devices; magnetic disks, such as internal hard disks and removable disks; magneto-optical disks; RAM; and CD-ROM and DVD-ROM disks. In some examples, communication device-readable media may include non-transitory communication device-readable media. In some examples, communication device-readable media may include communication device-readable media that is not a transitory propagating signal.

The instructions may further be transmitted or received over a communications network using a transmission medium via a network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a LAN, a WAN, a packet data network (e.g., the Internet), mobile telephone networks (e.g., cellular networks), Plain Old Telephone (POTS) networks, and wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, a Long Term Evolution (LTE) family of standards, a Universal Mobile Telecommunications System (UMTS) family of standards, or peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using single-input multiple-output (SIMO), MIMO, or multiple-input single-output (MISO) techniques. In some examples, the network interface device may wirelessly communicate using Multiple User MIMO, techniques. The term "transmission medium" shall be taken to include any intangible medium that is capable of storing, encoding, or carrying instructions for execution by the communication device, and includes digital or analog communications signals or other intangible media to facilitate communication of such software.

As discussed above, an eNB may have multiple antennas that may be used in various groupings and with various signal modifications for each grouping to produce a plurality of APs. Each AP may be defined for one or more antennas. Each AP may correspond to a different transmission signal direction. Using the different APs, the eNB may transmit multiple layers with codebook-based or non-codebook-based preceding techniques. Each AP may correspond to a beam that transmits AP-specific CSI-RS signals. The UE may contain a plurality of receive antennas that may be used selectively to create Rx beamforming. Rx beamforming may be used to increase the receive antenna (beamforming) gain for the direction(s) on which desired signals are received and to suppress interference from neighboring cells. Fast Rx beam refinement, in which the Rx beam direction is dynamically adjusted in response to the channel conditions measured by the UE, is desirable from a performance standpoint.

This may be particularly desirable with use of the high-frequency bands around, for example, 28 GHz, 37 GHz, 39 GHz, and 64-71 GHz, used in conjunction with carrier aggregation, which may permit networks to continue to service the never-ending hunger for data delivery. The increased beamforming gain in this frequency range may permit the UE and eNB to compensate for the increasingly likely event of severe pathloss and suppress mutual user interference, leading to an increase in system capacity and coverage.

To maximize the beamforming gain, as indicated above, the UE may search for an optimum Tx/Rx beam pair using the BRS. However, the BRS is a broadcast signal that is transmitted periodically on all Tx beams in a fixed manner. This means that to detect the BRS, the UE may have to wait until the next BRS subframe for Rx beam refinement if the UE has just missed the BRS. This, however, may not be fast enough in some circumstances. In addition to or instead of using the BRS, the CSI-RS or Sounding RS (SRS) also can be utilized for Rx beam refinement. In this case, however, the Tx beams on the RS used are limited to the most recent reported BRS measurement. Thus, a BRRS may be produced for transmission on the same Tx beam as data to be transmitted to the UE.

In some embodiments, to achieve faster Rx beam refinement and update the Rx beam, a BRRS may be transmitted on the same Tx beam as data to be transmitted to the UE. The BRRS, along with the temporal proximity relative to the data OFDM symbols (e.g., within 6, 13, or 25 ms), establishes an association between the BRRS and the data on the same Tx beam. Multiple BRRS symbols may be transmitted using the same Tx beam. Such Rx-beam refinement may enable the UE and eNB to use the selected beam to communicate more effectively. However, not all UEs may use BRRS symbols. This may result in the BRRS symbols of one set of UEs and the data symbols of another set of UEs causing mutual interference with each other. To avoid the interference, BRRS symbol mapping and a specific BRRS format may be used.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM). RAM, magnetic disk storage media, optical storage media, flash-memory devices, and other storage devices and media. Some embodiments may include one or more processors and may be configured with instructions stored on a computer-readable storage device.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiments" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a user equipment (UE) for narrowband internet-of-Things (NB-IoT) communication, the apparatus comprising:
   a memory; and
   processing circuitry in communication with the memory and arranged to:
      monitor signals on a first transmission bandwidth for a narrowband system with the first transmission bandwidth comprising a single physical resource block bandwidth;
      determine that a control channel transmission from a base station comprising at least a first narrowband physical downlink control channel (NB-PDCCH) is mapped to a first physical resource block including subcarriers of the first transmission bandwidth and orthogonal frequency division multiplexed symbols of at least a first subframe; and
      blind decode the control channel transmission comprising the first NB-PDCCH by processing a first physical resource block including the subcarriers of the first transmission bandwidth and the orthogonal frequency division multiplexed symbols of the first subframe to determine the control channel transmission, wherein said blind decoding further comprises attempting to blind decode a plurality of combinations of consecutive subframes, wherein different NB-PDCCH candidates are transmitted over different numbers of consecutive subframes.

2. The apparatus of claim 1, wherein the processing circuitry is further configured to blind decode the control channel transmission from the base station by processing a plurality of physical resource blocks, the plurality of physical resource blocks comprising the first physical resource block, wherein each physical resource block of the plurality of resource blocks comprises all subcarriers of the first transmission bandwidth for corresponding time periods.

3. The apparatus of claim 2, wherein the corresponding time periods for the plurality of physical resource blocks are consecutive in time domain.

4. The apparatus of claim 2, wherein the corresponding time periods for the plurality of physical resource blocks are not all consecutive in time domain.

5. The apparatus of claim 2, wherein the processing circuitry is further configured to extract modulated symbols of the control channel transmission according to a specified resource element grouping.

6. The apparatus of claim 5, wherein a subcarrier of one orthogonal frequency division multiplexed symbol comprises a resource element of the specified resource element grouping.

7. The apparatus of claim 5, wherein the specified resource element grouping comprises a first subcarrier of a first subframe.

8. The apparatus of claim 7, wherein the specified resource element grouping further comprises modulated symbols of the control channel transmission mapped to a direct current (DC) subcarrier of an orthogonal frequency division multiplexing (OFDM) waveform.

9. The apparatus of claim 7 or 8, wherein the specified resource element grouping comprises pairs of subcarriers, each pair of subcarriers comprising modulated symbols with a first mapped frequency and a second mapped time.

10. The apparatus of claim 6, wherein the specified resource element grouping comprises a plurality of resource element groups, wherein a number of resource element groups of the plurality of resource element groups is fixed within a first subframe; and
wherein the number of resource elements within each resource element group of the plurality of resource element groups is variable.

11. The apparatus of claim 6, wherein the specified resource element grouping comprises a plurality of resource element groups, wherein the plurality of resource element groups are variable in number within a first subframe.

12. The apparatus of claim 11, wherein the number of resource elements within each resource element group of the plurality of resource element groups is variable.

13. The apparatus of claim 1, further comprising:
an antenna configured to receive the signals on the first transmission bandwidth and transmit the signals to the processing circuitry.

14. A computer-readable storage medium that stores instructions for execution by one or more processors of a user equipment (UE), the one or more processors to configure the UE to:
monitor signals on a first transmission bandwidth for a narrowband system with the first transmission bandwidth comprising a single physical resource block bandwidth;
determine that a control channel transmission from a base station comprising at least a first narrowband physical downlink control channel (NB-PDCCH) is mapped to a first physical resource block including subcarriers of the first transmission bandwidth and orthogonal frequency division multiplexed symbols of at least a first subframe; and
blind decode the control channel transmission comprising the NB-PDCCH by processing a first physical resource block including the subcarriers of the first transmission bandwidth and the orthogonal frequency division multiplexed symbols of the first subframe to determine the control channel transmission, wherein said blind decoding further comprises attempting to blind decode a plurality of combinations of consecutive subframes, wherein different NB-PDCCH candidates are transmitted over different numbers of consecutive subframes.

15. The computer-readable storage medium of claim 14, wherein a subcarrier of one orthogonal frequency division multiplexed symbol comprises a resource element of the specified resource element grouping.

16. The apparatus of claim 15, wherein the specified resource element grouping comprises a first subcarrier of a first subframe; and wherein the specified resource element grouping further comprises modulated symbols of the control channel transmission mapped to a direct current (DC) subcarrier of an orthogonal frequency division multiplexing (OFDM) waveform.

17. The apparatus of claim 15, wherein the specified resource element grouping comprises pairs of subcarriers, each pair of subcarriers comprising modulated symbols with a first mapped frequency and a second mapped time.

18. The apparatus of claim 15, wherein the specified resource element grouping comprises a plurality of resource element groups, wherein the plurality of resource element groups are fixed in number within a first subframe; and
wherein the number of resource elements within each resource element group of the plurality of resource element groups is variable.

19. The apparatus of claim 15, wherein the specified resource element grouping comprises a plurality of resource element groups, wherein the plurality of resource element groups are variable in number within a first subframe; and
wherein the number of resource elements within each resource element group of the plurality of resource element groups is variable.

20. An apparatus of a base station for encoding control channel signals for narrowband Internet-of-Things (IoT) communications, the apparatus comprising:
a memory; and
processing circuitry in communication with the memory and arranged to:
encode a first control transmission using a first physical resource block, wherein the first resource block comprises all subcarriers of a transmission bandwidth for the IoT communications and all orthogonal frequency division multiplexed symbols of a first subframe, for transmission to a first user equipment (UE), wherein the first control transmission comprises a first narrowband physical downlink control channel (NB-PDCCH) candidate for the first UE to attempt to blind decode, wherein the NB-PDCCH candidate is selected from a plurality of NB-PDCCH candidates corresponding to transmission over different numbers of consecutive subframes.

21. The apparatus of claim 20, wherein the processing circuitry is further configured to encode the first control transmission from the base station to the UE using a plurality of physical resource blocks, the plurality of physical resource blocks comprising the first physical resource block, each physical resource block of the plurality of resource blocks comprising all subcarriers of the transmission bandwidth for corresponding time periods.

22. The apparatus of claim 21, wherein the corresponding time periods for the plurality of physical resource blocks are not all consecutive in the time domain.

23. The apparatus of claim 21, wherein the processing circuitry is further configured to encode the first control transmission according to specified resource element groupings comprising a plurality of resource element groups, each resource element group of the plurality of resource element groups comprising one or more resource elements.

24. A computer-readable storage medium that stores instructions for execution by one or more processors of a base station, the one or more processors to configure the base station to:
encode a control channel transmission for a first user equipment (UE), the control channel transmission comprising at least a first narrowband physical downlink control channel (NB-PDCCH) that is mapped to a first physical resource block, wherein the first physical resource block comprises subcarriers of a transmission bandwidth and orthogonal frequency division multiplexed symbols of at least a first subframe, wherein the control channel transmission is for blind decoding at the UE via processing the first physical resource block including the subcarriers of the transmission bandwidth and the orthogonal frequency division multiplexed symbols of the first subframe to determine the control channel transmission, wherein the NB-PDCCH is selected from a plurality of NB-PDCCH candidates corresponding to transmission over different numbers of consecutive subframes; and initiate transmission of the NB-PDCCH to the first UE.

25. The computer-readable storage medium of claim 24 wherein the control channel transmission is encoded according to specified resource element groupings comprising a plurality of resource element groups, each resource element group of the plurality of resource element groups comprising one or more resource elements;
  wherein the specified resource element grouping comprises a first subcarrier of a first subframe; and
  wherein the specified resource element grouping further comprises modulated symbols of the control channel transmission mapped to a direct current (DC) subcarrier of an orthogonal frequency division multiplexing (OFDM) waveform.

26. The apparatus of claim 25, wherein the plurality of resource element groups are fixed in number within a first subframe; and
  wherein the number of resource elements within each resource element group of the plurality of resource element groups is variable.

* * * * *